United States Patent
Rouland et al.

(10) Patent No.: US 11,500,624 B2
(45) Date of Patent: Nov. 15, 2022

(54) CREDENTIAL MANAGEMENT FOR IOT DEVICES

(71) Applicant: Phosphorus Cybersecurity Inc., Greensboro, GA (US)

(72) Inventors: Christopher J. Rouland, Greensboro, GA (US); Earle W. Ady, Encinitas, CA (US); Trent Altman, Carlsbad, CA (US)

(73) Assignee: Phosphorus Cybersecurity Inc., Nashville, TN (US)

( * ) Notice: Subject to any disclaimer, the term of this patent is extended or adjusted under 35 U.S.C. 154(b) by 0 days.

(21) Appl. No.: 16/937,739

(22) Filed: Jul. 24, 2020

(65) Prior Publication Data
US 2020/0409689 A1  Dec. 31, 2020

Related U.S. Application Data

(63) Continuation of application No. 16/914,851, filed on Jun. 29, 2020, now Pat. No. 11,269,619.
(Continued)

(51) Int. Cl.
*G06F 9/44* (2018.01)
*G06F 8/654* (2018.01)
(Continued)

(52) U.S. Cl.
CPC .............. *G06F 8/654* (2018.02); *G06F 8/71* (2013.01); *G06F 21/572* (2013.01); *G16Y 30/00* (2020.01);
(Continued)

(58) Field of Classification Search
CPC ...................................... G06F 8/654
(Continued)

(56) References Cited

U.S. PATENT DOCUMENTS 8,554,883 B2 * 10/2013 Sankaran ............ H04L 41/0813
   709/221
8,625,802 B2 *  1/2014 Parann-Nissany .... G06F 21/602
   380/278
(Continued)

FOREIGN PATENT DOCUMENTS

EP   1449347 B1 * 10/2012 ........... G06Q 20/367

OTHER PUBLICATIONS

Lee, B. et al. Blockchain-based Secure Firmware Update for Embedded Devices in an Internet of Things environment. The Journal of Supercomputing, 73(3), pp. 1152-1167. Sep. 13, 2016. <https://link.springer.com/article/10.1007/11227-016-1870-0>.
(Continued)

*Primary Examiner* — Evral E Bodden
(74) *Attorney, Agent, or Firm* — Morrison & Foerster LLP

(57) ABSTRACT

A process for management of Internet-of-Things (IoT) devices includes a management system for identifying, interrogating, and updating devices connected to one or more networks. The management system can include a data store for storing various data related to the devices and the various processes of the management system. The management system can include a controller for executing processes such as interrogation processes, firmware change processes, credential change processes, and other processes. The controller can determine versions of firmware and other configuration properties of a device and generate various profiles for updating the firmware and other configuration properties. The controller can determine upgrade paths for updating the firmware and other configuration properties from a first version to a second version, the upgrade paths including one or more intermediary versions for facilitating the upgrade path. The management system can update
(Continued)

devices individually, on a device family basis, or on a system-wide basis.

30 Claims, 8 Drawing Sheets

Related U.S. Application Data

(60) Provisional application No. 62/867,352, filed on Jun. 27, 2019.

(51) Int. Cl.
    *G16Y 30/00*     (2020.01)
    *H04L 9/06*     (2006.01)
    *H04L 67/00*     (2022.01)
    *H04L 9/32*     (2006.01)
    *G06F 21/57*     (2013.01)
    *G06F 8/71*     (2018.01)
    *H04L 9/00*     (2022.01)

(52) U.S. Cl.
    CPC .......... *H04L 9/0637* (2013.01); *H04L 9/3236* (2013.01); *H04L 67/34* (2013.01); *H04L 9/50* (2022.05)

(58) Field of Classification Search
    USPC ........................................................ 717/168
    See application file for complete search history.

(56) References Cited

U.S. PATENT DOCUMENTS

| | | | | |
|---|---|---|---|---|
| 9,778,999 | B2* | 10/2017 | Martin | H04L 67/12 |
| 10,594,482 | B2* | 3/2020 | Bender | G06F 21/44 |
| 2008/0126478 | A1* | 5/2008 | Ferguson | G16H 40/67 |
| | | | | 709/203 |
| 2011/0055899 | A1* | 3/2011 | Dollar | H04L 41/28 |
| | | | | 726/3 |
| 2014/0241354 | A1* | 8/2014 | Shuman | H04L 12/281 |
| | | | | 370/390 |
| 2015/0281227 | A1* | 10/2015 | Fox Ivey | H04L 63/083 |
| | | | | 713/168 |
| 2018/0103039 | A1* | 4/2018 | Thaler | H04L 41/0806 |
| 2018/0176229 | A1 | 6/2018 | Bathen et al. | |
| 2020/0177589 | A1* | 6/2020 | Mangalvedkar | H04L 67/12 |

OTHER PUBLICATIONS

Yu, M. et al. Internet of Things Security and Privacy-Preserving Method Through Nodes Differentiation, Concrete Cluster Centers, Multi-Signature, and Blockchain. International Journal of Distributed Sensor Networks, 14(12), 1550147718815842. Dec. 25, 2018. <https://journals.sagepub.com/doi/pdf/10.1177/1550147718815842>.

Lu, C.H. et al. A Secure Firmware Upgrade Scheme with Private-tracker-governed and Smart- 1-20 contract-driven design for Blockchain-enabled IoT Devices. Sep. 17, 2017. <http://maselab318.nfu.edu.tw/tsong/CACS/CACS/1078.pdf>.

International Search Report and Written Opinion dated Oct. 29, 2020 for International PCT Patent Application No. PCT/US20/43265.

* cited by examiner

CREDENTIAL MANAGEMENT FOR IOT DEVICES

CROSS-REFERENCE TO RELATED APPLICATIONS

This application is a continuation of U.S. patent application Ser. No. 16/914,851, filed Jun. 29, 2020, entitled "FIRMWARE MANAGEMENT FOR IOT DEVICES," which claims the benefit of and priority to U.S. Patent Application No. 62/867,352, filed Jun. 27, 2019, entitled "CLASSIFICATION AND THIRD-PARTY FIRMWARE UPDATE FOR INTERNET OF THINGS," each of which are hereby incorporated herein by reference in their entireties.

TECHNICAL FIELD

The present systems and processes relate generally to the identification and management of internet of things (IoT) devices.

BACKGROUND

Previous approaches to managing IoT devices fail to provide systems and processes for identifying and managing IoT devices from a single, centralized interface. Consequently, previous solutions may not provide suitable infrastructure for supporting regular evaluation and maintenance of all IoT devices of a system, thereby potentially rendering each IoT device and the overall system vulnerable to attack and misuse. IoT devices can function as points of vulnerability when not managed properly and regularly. For example, failure to regularly audit and update credential policies, security settings, firmware versions, and other configuration properties of an IoT device can increase a risk that the IoT device will be accessed by unauthorized entities using known vulnerabilities. The exploitation of an IoT device by attackers can threaten not only the function of the individual device but may also render a system connected to the IoT device vulnerable to malicious activities. For example, an IoT device configured for access using default credentials or having a known vulnerability may be exploited by a malicious attacker that uses the IoT device as an access point from which other attacks are launched against a larger system connected to the IoT device. In another example, an IoT device may include an open port by which an attacker can communicate with the device Effective management of IoT devices can be challenging due to a variety of factors including, but not limited to, difficulties in tracking and configuring most-current or most-optimal settings and firmware on a variety of devices, difficulties in preventing employees from connecting unknown IoT devices to a network, difficulties in knowing when an IoT device may have a vulnerability (e.g., a printer may run a Linux operating system with security vulnerabilities if not updated), difficulties in identifying proper credentials for accessing devices. Because a system may include tens to thousands of IoT devices of varying make, model, and function, the large and diverse volume of devices can drastically increase the potential time and effort required to efficiently access, evaluate, and update each device.

Therefore, there is a long-felt but unresolved need for a system or process that allows for effective and efficient identification and management of IoT devices.

BRIEF SUMMARY OF THE DISCLOSURE

The present systems and processes relate generally to identifying devices on a network, performing a deep analysis of capabilities of the devices, determining and initiating updates of the identified devices. Briefly described, and according to one embodiment, aspects of the present disclosure generally relate to systems and processes for secure identification, evaluation, and maintenance of IoT devices.

In at least one embodiment, as used herein, "IoT device" can refer to a device connected to a networked environment with the ability to transfer data over a network without requiring human-to-human or human-to-computer interaction. In the proceeding description, IoT devices are generally referred to as devices. Non-limiting examples of such devices include consumer electronics, peripherals, appliances, home/office automation, communications/networking equipment, entertainment systems, alarm systems, and any other systems including embedded processors or computing technology.

Systems and processes described herein can support the identification and management of one or more devices. Identification includes, for example, scanning networks, or other operating environments, for devices that may be represented by network addresses. In one example, the system determines makes, models, and versions of detected devices, based on network addresses thereof, to support their identification and management. The system can use various data sources, as well as heuristics-, rules-, and/or machine learning-based techniques for device identification. For example, the system can include a data store comprising information describing various device families (e.g., classes of devices corresponding to a similar or identical model, grouping, make, or manufacturer). In another example, the system leverages signature analysis techniques across multiple feature spaces and modalities to securely identify devices.

Management includes, for example, securely upgrading versions of firmware, drivers, and etc., updating policies for configuration of credentials, and disabling settings that, when enabled, may render a device more vulnerable to attack. The system can determine upgrade paths for upgrading elements of a device, such as firmware, from a first version (e.g., that may be outdated and introduce security vulnerabilities) to a second version, such as a most-recently released version of firmware from a manufacturer of the device. The system can communicate with a Privileged Asset Management (PAM) system to update credential rules and policies that are used to control the generation of credentials for accessing specific devices or families of devices. Machine learning (either supervised or unsupervised) and/or heuristics techniques may be used for matching devices with configured firmware, credentials, and other configuration updates.

The system can perform a deep asset identification process to detect and interrogate devices. The system can scan one or more networks and identify one or more devices connected to the networks. For each identified device, the system can determine a corresponding device family associated therewith and, further, can determine properties of the device family, such as, for example, an interrogation profile that provides specific details for how to interrogate devices corresponding to the device family. For example, the interrogation profile can allow the system to implement computer-based use of a user interface and/or utilize an application programming interface (API) for managing various aspects of devices of the device family. Based on the interrogation profile of the corresponding device family, the system can interrogate each device, determine device data thereof, such as a current firmware image and configuration properties, and perform updates or modifications of the current properties or firmware to ensure the device is secure against attacks.

The system can perform a managed updated process to update or modify various properties, software, and firmware of various devices. The system can determine (e.g., based on device data from an interrogation process) a version of a current firmware image, configuration properties, and other settings of a device. Based on the current firmware image, configuration properties, or other settings, the system can determine an optimal or configured version of the firmware image, configuration properties, or other settings to which the device may be updated or changed. In one example, a sequence of firmware image versions are stored in a blockchain ledger store and the system obtains and verifies a firmware image from the blockchain ledger store when changing the firmware of a device from a current ("first") firmware image to a second firmware image. In the same example, based on an upgrade path, the system can update the first firmware image to an intermediary firmware image and, finally, to a second firmware image. The determination of upgrade or downgrade paths (both referred to herein as upgrade path) allows for a device to be properly upgraded or downgraded, for example, in instances where the device was disconnected from an upgrade management system, initially installed with a default version, or neglected by an administrator and, thus, has experienced multi-version lapses in upgrading from previous versions of firmware or other configuration properties that may leave the device vulnerable to attacks. Similarly, the system can skip or avoid specific versions of firmware based on the upgrade path. The upgrade path may include an indication that one or more versions of firmware contain vulnerabilities or bugs that should be avoided.

The system can manage credentials for devices on one or more networks (e.g., the devices having been identified and interrogated). The system can generate and apply credential or password policies based on policies for specific devices or families in a data store, heuristics, machine learning processes, or combinations thereof, to enforce the use of credentials and passwords optimized for ensuring device security. The system can determine credential or password requirements for each family of devices on the one or more networks and can update credentials on devices thereof according to the requirements and policies. In various embodiments, the system may not generate or store credentials or passwords and, instead, credentials and passwords are generated and securely stored in a privileged asset management (PAM) system. The PAM system may be unaware of the specific devices and is only aware of credentials as well as the requirements and policies provided by the system in requests for generation or retrieval of corresponding credentials.

The system can perform various functions on a system-wide or network-wide basis in which all devices connected to one or more networks are identified, individually interrogated, and/or individually updated to a particular version of firmware or other configuration. It will be understood that, in addition to system-wide updates, updates can correspond to a subset of devices or device families identified by the system.

These and other aspects, features, and benefits of the claimed systems and processes will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1A:
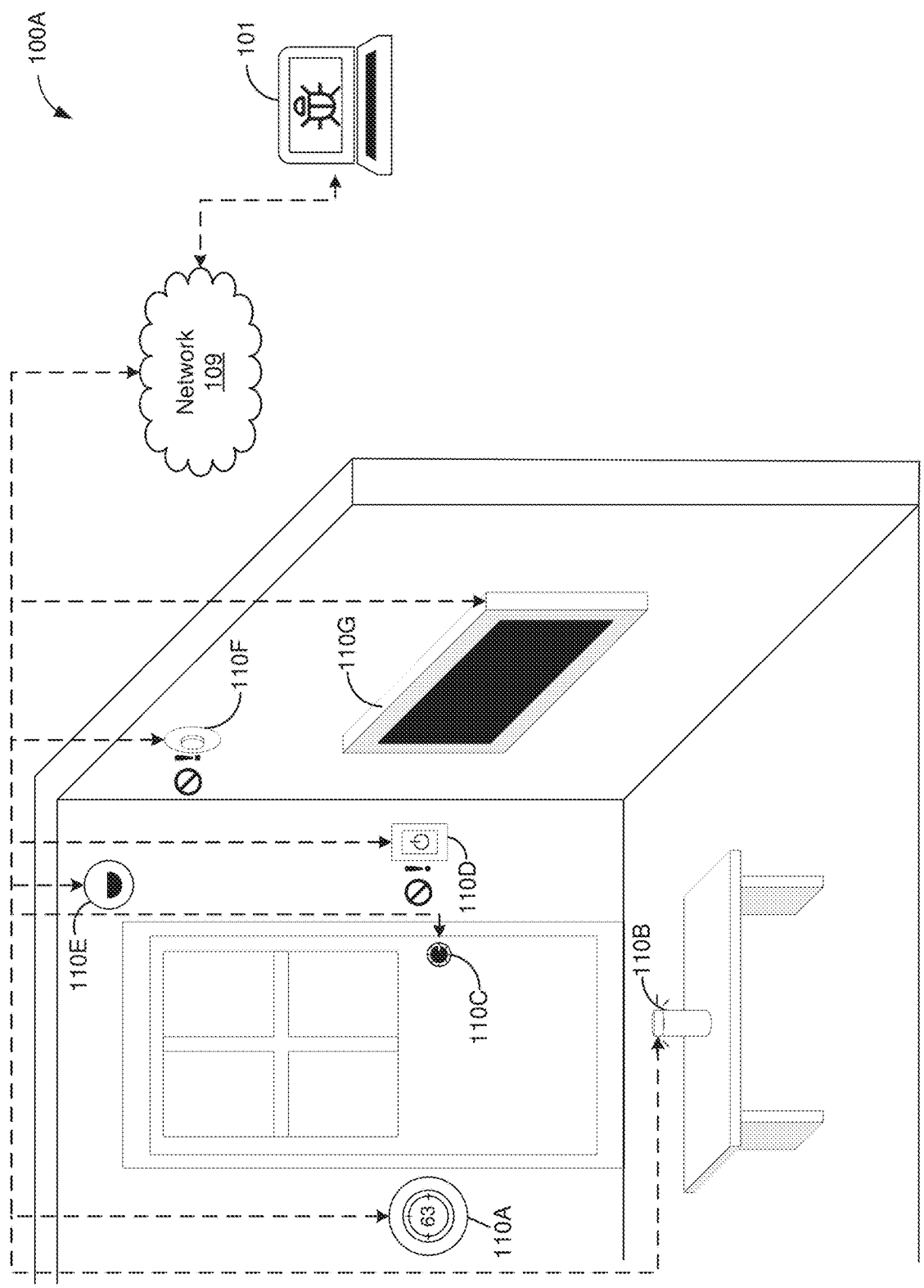
FIGS. 1A-B illustrate exemplary networked environments according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In the following paragraphs, the embodiments are described in further detail by way of example with reference to the attached drawings. In the description, well-known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

EXEMPLARY EMBODIMENTS

Turning now to the drawings, exemplary embodiments are described in detail. With reference to FIG. 1A, shown is an exemplary environment 100A including one or more devices 110A-F connected to a network 109. As shown, the network 109 is under attack by a malicious computing device 101 (e.g., controlled by an attacker, hacker, foreign government, non-state actor, etc.). The device 110 includes any Internet of Things (IoT) device, consumer electronic, peripheral, appliance, home/office automation system, communication and networking equipment, entertainment system, alarm system, and any other system including embedded processors or computing technology. A non-limiting example of devices 110 include cameras, printers, scanners, sound systems, thermostats, smoke and CO2 detectors, security systems, surveillance systems, medical sensors, microphones, vehicles, shopping carts, locking mechanisms, assistive robotic devices, light controls and sources, and industrial equipment. Each device 110 can include storage, processing, and communication components, among other components. Data stored on each device 110 can include, but is not limited to, a unique identifier, firmware, and configuration properties. Each device 110 can be associated with one or more device families. A device family can refer to a plurality of devices 110 that share one or more common elements including, but not limited to, function, manufacturer or vendor, model, version, and other elements. As one example, a device family may include all scanners released from a particular company, released with a particular character sequence in a model number, product name, or other product metadata (e.g., a family of models starting with MX would include devices labeled MX100, MX103, and MX220).

For exemplary purposes, the devices 110A-G can correspond to, respectively, thermostats, speakers, locks, light sources, security cameras, smoke detectors, and monitors. Each of the devices 110A-G can be connected to a network 109, which may represent a single network or a plurality of networks. Because each of the devices 110A-G is connected to the network 109, the compromising and exploitation of any of the devices 110A-G can allow for malicious actions to be carried out against other devices on the network 109 (or the network 109 itself).

In one example, device 110D is a wireless fidelity (WiFi)-enabled power switch for IoT-based control of light sources. The device 110D was installed and connected to the network 109. The device 110D was not regularly updated following installation and, as a result, uses a previous version of firmware that was replaced by the manufacturer due to a security exploit being discovered that allowed for malicious devices 101 to gain control of the device 110D, such as, for example, from outside of the building over a wide area network (WAN) or WiFi network. The manufacturer of the device 110D in this example discovered and fixed the security vulnerability in a subsequent firmware version that the device 110D has not been updated too. As a result, an attacker in control of the malicious device 101 can use the security exploit to access the device 110D and take malicious actions such as uploading malware to other devices connected to the network 109, monitoring private network traffic, stealing secure information, or other malicious activity.

In the same example, device 110F is an IoT-based smoke detector. The device 110F utilizes a most recent firmware version; however, following initial configuration, credentials for accessing and configuring the device 110F were left unchanged and, thus, correspond to the manufacturer's default credentials. Accordingly, the malicious device 101, operated by an attacker, is able to access the device 110F using the manufacturer's default credentials and take malicious actions such as disabling the smoke detector, as well as exploiting the device 110F to access other devices on the network 109. Thus, in the above example, the lack of updates and credential management increased the vulnerability of the devices 110D, 110F and all devices on the network 109 to malicious attacks.

Further, the default configurations for the devices 110 can have features unnecessarily enabled that may present security risks. As an example, a television device 110G with a wire-based networked connection may have WiFi turned on without using WiFi. A smoke detector 110F may have port 80 enabled for web access even though device access is through the manufacturer's proprietary service. The WiFi software in the device 110G or web server software in the smoke detector 110F may have security vulnerabilities that are unnecessarily exposed to malicious device 101.

Figure 1B:
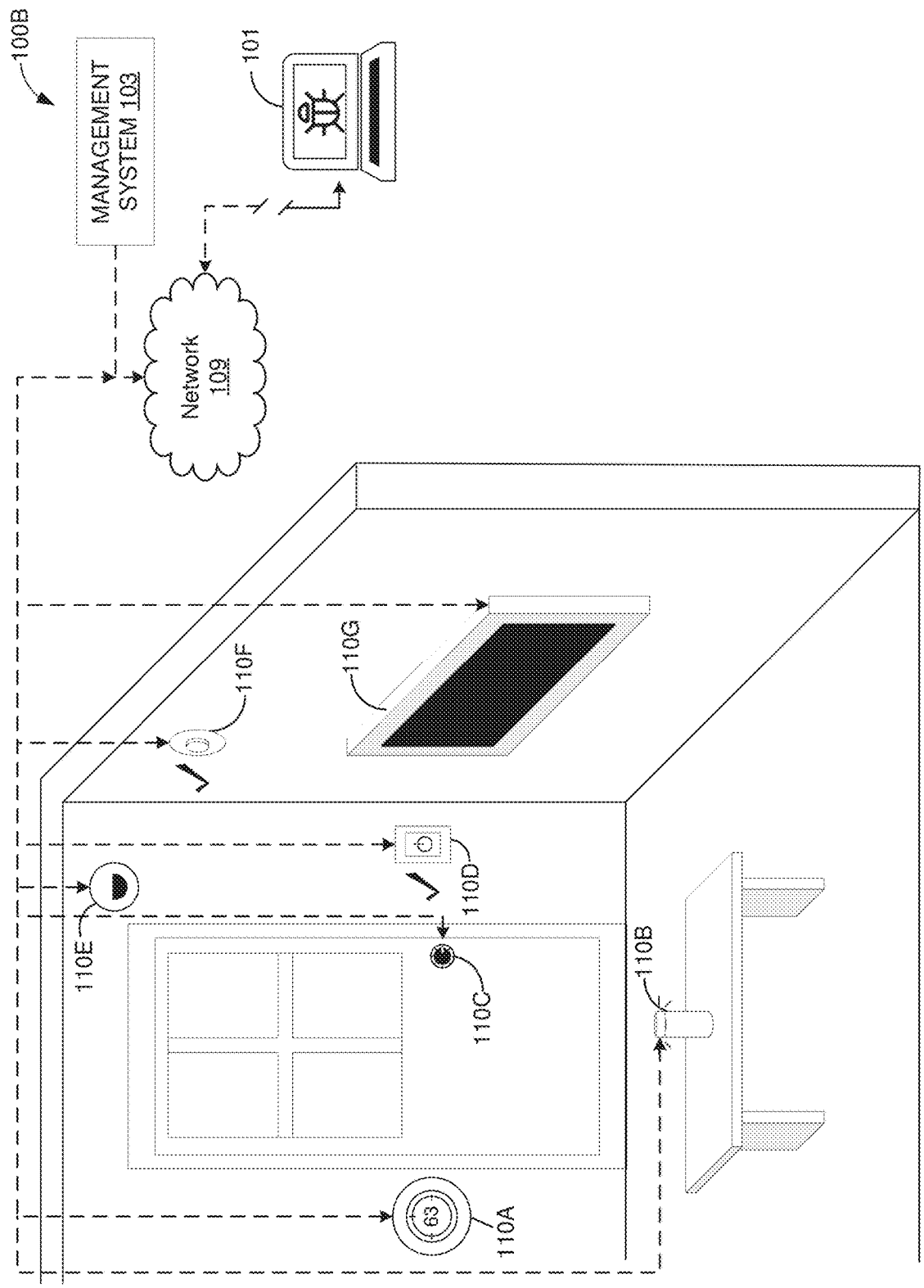

FIG. 1B shows an exemplary environment 100B that includes the plurality of devices 110A-G. In contrast to what is shown in FIG. 1A, the one or more devices 110A-G of FIG. 1B are being managed by a management system 103 that manages firmware versions and other properties of the devices 110A-G to ensure they are configured for optimal security and, in some embodiments, performance. The management system 103 can include one or more computing devices that are configured to execute software and/or utilize hardware to perform the discussed features. As another example, the management system 103 disables wireless connectivity functions of the smoke detector device 110F and disables unused and unsecured ports on the power switch device 110D to prevent their accessing by external devices 101. As yet another example, the management system 103 can disable the WiFi on device 110G and the web server on smoke detector 110F.

The malicious device 101 cannot utilize the security vulnerability to gain access to the device 110D because the firmware has been updated by the management system 103 to include the manufacturer's fix to the security vulnerability. Further, the malicious device 101 does not know the credentials for device 110F because the credentials are rotated on an interval by the management system 103 rather than being set to the default credentials. The malicious device 101 cannot try to hack into the WiFi on device 110G or connect and exploit the webserver on smoke detector 110F because the management system 103 disabled both features.

Figure 2:
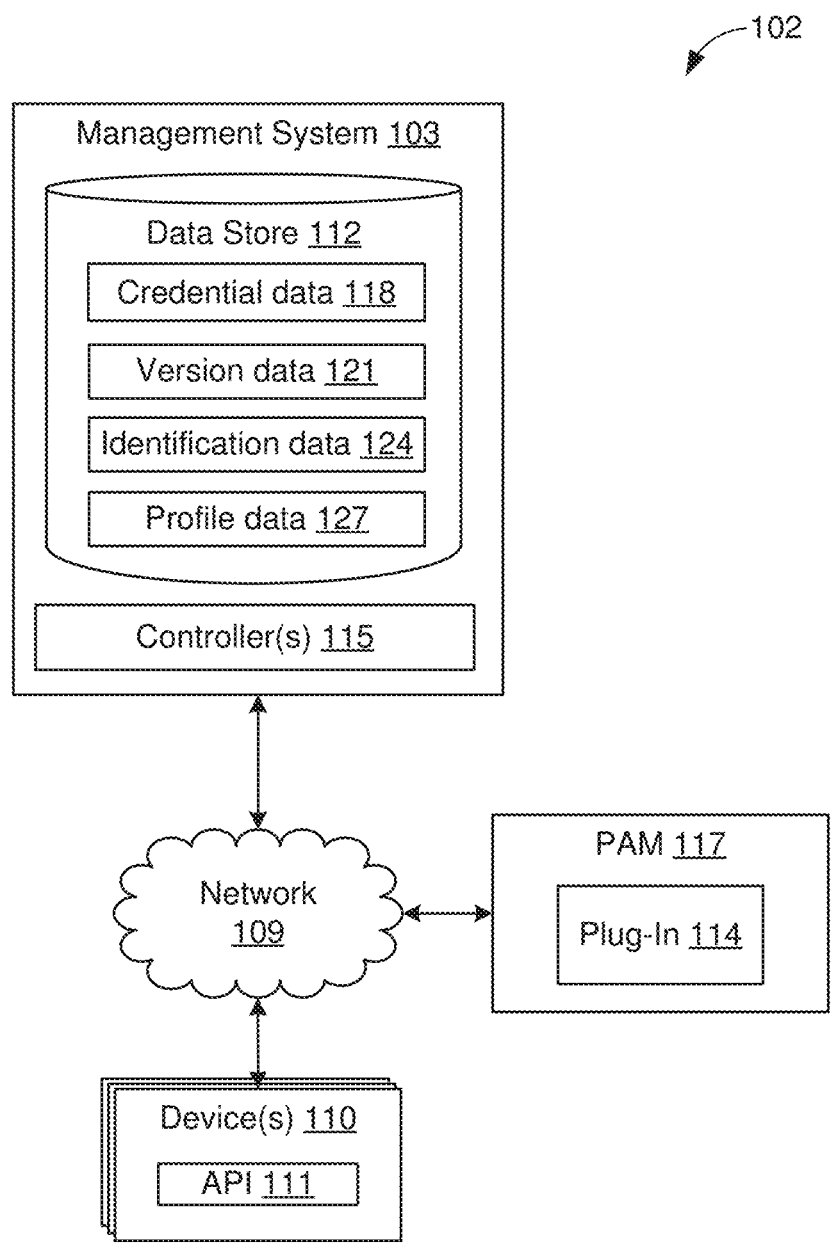
FIG. 2 illustrates an exemplary networked environment according to one embodiment of the present disclosure.

For the purposes of example and explanation of the fundamental processes and components of the disclosed systems and processes, reference is made to FIG. 2, which illustrates an exemplary networked environment 100. As will be understood and appreciated, the networked environment and elements thereof shown in FIG. 2 represents merely one approach or embodiment of the present system, and other aspects are used according to various embodiments of the present system.

The networked environment 102 can include the management system 103 that is operative for communicating with one or more devices 110 via a network 109. The management system 103 be part of a computing environment including a desktop, workstation, or server computer, a virtual machine, a virtualization container, a mobile computing machine such as tablet or smartphone, or any other such computing machine or system. The management system 103 can include a server computer, or any other system providing computing capability. In some embodiments, the management system 103 includes a plurality of computing devices that may be arranged, for example, in one or more server banks or computer banks or other arrangements. Such computing devices can be located in a single installation or may be distributed among many different geographical locations. For example, the management system 103 can include one or more computing devices that together may include a hosted computing resource, a grid computing resource, and/or any other distributed computing arrangement. In one example, the management system 103 corresponds to an elastic computing resource in which an allotted capacity of processing, network, storage, or other computing-related resources may vary over time.

The management system 103 can receive requests for and initiate processes to be performed on a device 110, a device family, or all devices 110 connected to a network, such as from a command, request, or automated schedule. For example, the management system 103 can receive a request for a system-wide configuration update to disable all unused ports on all devices 110 connected to the network 109. System-wide can generally refer to all devices 110 identified by the management system 103. In coordination with other components of the management system 103 can interrogate and update devices 110 according to profiles 127. The profiles can include interrogation profiles and change profiles generated by the controller 115. The management system can receive various data associated with each device 110 in response to performing a scanning or request action, or from performing an interrogation process on devices 110. In one example, the management system 103 scans one or more 110 on the network 109 and, as a result, receives network addresses corresponding to each of the devices 110.

The management system 103 can include a data store 112 for storing various data related to the plurality of devices 110 and related to various functions and actions occurring in the networked environment 102. The management system 103 can execute various software including one or more controllers 115 to perform the various functions described herein. The data store 112 includes, but is not limited to, credential data 118, version data 121, identification data 124, profiles 127, and other data.

Credential data 118 includes default credentials for devices 110 that are generated by the controller 115, for example, in coordination with a PAM system 117 or obtained from respective manufacturers of each device 110. Credential data 118 can exclude non-default credentials or a secure portion of non-default credentials that are generated, for example, by the PAM system 117 based on password policies generated by the controller 115. Non-limiting examples of credential data 118 include, but are not limited to, default usernames, passwords, signatures, public-private key pairs (e.g., for accessing secure shells (SSHs) of devices 110). The credential data 118 may include identifying information for credentials not stored in credential data 118. As an example, the PAM system 117 may store seven versions of credentials for a particular device 110. The credential data 118 may store an identifier from the PAM system 117 for each of the seven versions of the credentials associated with an identifier for the particular device 110. As discussed below, version data 121 can include mappings between default credentials and versions of firmware images (or other data) with which each default credential is associated.

Version data 121 can include various versions of firmware images, configuration policies and properties, and other data for controlling properties and performances of devices 110. For example, version data 121 can include settings for various connectivity configurations of a device 110 or device family, such as hypertext transfer protocol (HTTP) connection settings, proprietary socket connection settings, and file transfer protocol (FTP) connection settings. As another example, the version data 121 can include vulnerability data describing firmware versions, images, settings, and other data determined to contribute to a vulnerable status of a device 110 when installed. Configuration policies include, for example, access policies, device discovery or visibility properties, communication policies, data sharing policies, security policies, and other policies. Configuration properties can include possible values for each configuration based on the corresponding configuration policy. For example, the configuration policy can include a configuration property comprising a particular value that, when provided on a device 110, causes the device 110 to be discoverable to other devices on the network 109 or via other communication modes such as Bluetooth or cellular networks. In some embodiments, version data 121 is only accessible upon generation and authentication/verification of a hash or other authentication data, such as public-private key pairs or digital signatures. The version data 121 can securely include temporarily cached data, such as, for example, credentials received from a PAM system 117, the cached data being purged immediately following its use by the controller 115 to execute various actions or marked for subsequent deletion after use.

The version data 121 can be used to configure and generate updates for devices 110 corresponding to any potential protocol or configuration state thereof. The version data 121 includes mappings or upgrade paths corresponding to sequences by which profiles, images, firmware, etc. must be installed on a device 110 (e.g., based on manufacturer design parameters, and/or heuristics-based or machine-learned parameters). In one example, version data 121 includes an upgrade path specifying a sequence by which a firmware image of a device 110 must be updated to change the firmware image from a first version (e.g., a default version) to an $n^{th}$ current version that is most supportive of ideal operation and security of the device 110. The version data 110 may specify that to upgrade from a current version of firmware to a particular version of firmware, an intermediary version of firmware must be installed first. In some embodiments, the mapping or upgrade path is generated by one or more controllers 115 based on version data 1212 and a current version of firmware configured on a corresponding device 110. The firmware and potentially the mappings associated therewith, including firmware image versions, configuration policies, etc., can be stored as a substantially trustless data structure, such as a blockchain ledger store or the like. For example, firmware images of various versions for a particular device 110 can be stored in a blockchain ledger store. In some embodiments, the firmware blockchain can provide a mapping between each firmware image version. In the same example, a controller 115 can determine a current version (e.g., a first version) of a firmware image installed on a device 110 and can generate an upgrade path for upgrading the firmware image from the first version thereof to an intermediate version and finally to a second version.

The identification data 124 can include identifying signatures, hashes, or identifying information for a wide variety of devices 110 including, but not limited to, make, model, and version data. The identification data 124 can be stored in one or more tables, each table corresponding to a family or grouping of devices. Profiles 127 includes various profiles generated by the controller 115. The various profiles can include, but are not limited to, device profiles, change profiles, interrogation profiles, and other profiles described herein. Profiles 127 can include one or more of credential data 118, version data 121, and identification data 124, or can include mappings to the same.

The management system 103 can include one or more controllers 115 that each include one or more processors and other suitable resources for performing various actions related to the management of the devices 110. The management system 103 can communicate with a privileged asset management (PAM) system 117 via the network 109. In some embodiments, the management system 103 can utilize a plug-in 114 to communicate with the PAM system 117. The network 109 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. Communication with devices 110 can be supported via one or more application programming interfaces (APIs) 111.

The management system 103 can interrogate devices 110 from different device families using separate and distinct APIs 111 associated with each device family. For example, devices 110 of a first device family are interrogated via a first API 111A and devices 110 of a second device family are interrogated via a second API 111B. In one example, the first API 111A may correspond to a secure shell (SSH) connection through which SSH commands are issued while the second API 111B may correspond to submitting HTTP requests with POST or GET variables embedded in the request.

The controller 115 is configured for carrying out various functions and processes of the management system 103. The controller 115 can execute interrogation processes, firmware change processes, credential change processes, and other processes. The controller 115 can execute processes on a particular device 110, a family of devices 110, or all devices 110 on the network 109 (or other networks). In one example, a command can be received that instructs for a system-wide transition of all devices 110 from a first network 109 to a second network 109. In another example, a request instructs for the disabling of all universal plug and play (UPnP) settings of all devices 110. Based on a system-wide update, the controller 115 can determine a corresponding setting for each device 110 or each device family. The controller 115 can update each device 110 of each device family based on the determined corresponding setting.

The functionality of a controller 115 may be provided by a software application executed on the management system 103 including a virtual machine, virtual container, laptop computer, desktop computer, or other computing machine used to scan for, update, and maintain devices 110 without departing from the spirit or scope of the systems and processors presented herein. Functions performed by each controller 115 can include, but are not limited to, generating or determining profile data 127 of devices 110 (or device families thereof), determining various attributes, such as credential data 118 and version data 121 of devices 110, and initiating updates and other activities to be performed on devices 110.

The controller 115 can initiate a scan of network addresses on the network 109. The controller 115 can determine addresses for each computing device on the network 109 including the devices 110. The controller 115 can perform a series of queries to each network address to determine unauthenticated information, such as a media access control (MAC) address, which ports are open, serial number, model number, and other information. Because MAC addresses are assigned to computing vendors, the controller 115 can query a table or external system to identify the manufacturer and/or model based on the MAC address. The controller 115 can determine whether the device at each network address is an IoT device 110 as well as which device family each of the devices 110 below based on the unauthenticated data. Based on credential data 118 and the device family, the controller 115 can determine a set of default credentials and/or credential policies associated with the device family for each of the devices 110. The controller 115 can utilize an API corresponding to the device family to authenticate and generate authenticated data. The controller 115 can generate a device profile for each of the devices 110 based on unauthenticated data and the unauthenticated data obtained from interrogating each of the devices 110. The controller 115 can determine available configuration properties for each device 110 based on the device family and cause the collection of a current value of each available configuration property from each device 110 associated with the plurality of families.

The controller 115 can determine various profiles 127, such as firmware or credential change profiles 127, for each device 110 or each device family. Determining a change profile 127 can include, for example, the controller 115 identifying, in version data 121, current and/or security-optimized firmware images, settings, and configuration properties and values thereof that correspond to a particular device family. A change profile for the device family can include a list of services provided by the devices on the device family and configuration options available to query as well as expected responses to various queries or messages. The change profile can include a set of configurations to be deployed onto the device 110 such as ports to be disabled on each device 110, a firmware image corresponding to an expected version of firmware released by the manufacturer, a set of password requirements mandated by the manufacturer, and a set of password policies mandated by an administrator of the devices 110 and/or the network 109.

The controller 115 can perform various analyses and generate determinations from the device data received in response to interrogations of devices 110 and other data retrieved from the data store 115. The device data can include, for example, a current configuration of each device 110. Based on analyses of the current configurations, the controller 115 can determine one or more configuration changes to be deployed for each device 110. The analyses of the current configurations can be performed based on one or more stored rules or policies corresponding to each device 110 or device family with the device 110 is associated.

Based on a device family of each device 110, controller 115 can modify the one or more configuration settings to increase security, also referred to as hardening the settings of the device. In one example, a device family includes a set of printers, and the device data received in response to the interrogations includes a WiFi communication setting. In the same example, the controller 115 determines that the WiFi communication setting is enabled on a subset of the printers. Continuing this example, the controller 115 retrieves a policy for the device family that corresponds to the WiFi communication setting and determines that the WiFi communication setting should be disabled. In response to the determination, the controller 115 initiates a change on each printer that causes disabling of the WiFi communication setting.

The controller 115 can determine a profile of settings for a particular device 110 based on the particular device 110 or family of the particular device 110. The controller 115 can determine a group of settings that may increase the potential vulnerability of the particular device 110. The controller 115 can access the particular device 110 to determine the current configuration and settings of the particular device (e.g., using process 300) and identify adjustments based on the potential vulnerability data and the current configuration and settings. As an example, the controller 115 may determine that a setting is enabled but unused in a current configuration and disable the feature. As another example, the controller 115 may determine that a setting is in use but that a security vulnerability exists with the feature and disable the feature. The controller may require user/administrative confirmation before disabling a feature (e.g., via the interface 600 or similar). In some embodiments, the controller 115 may determine alternative configurations that accomplish the same feature (e.g., disabling UPNP and configuring the network settings in a different way to provide similar access).

The controller 115 can determine an update procedure for each device family and the determined update procedure can be used to facilitate the updating of each device 110 corresponding to the device family. The controller 115 can identify one or more security vulnerabilities of each device 110 and the identified vulnerabilities can be used as input to the determination of update procedures for rectifying the vulnerabilities (e.g., by disabling one or more configuration settings, updating firmware, and etc. of the device 110). Further non-limiting examples of configuration settings determined and modified by the management system 103 include HTTP connections, proprietary socket connections, and FTP connections. In some embodiments, the management system 103 can receive updates from a centralized repository including vulnerabilities for each device family, which may expand as new vulnerabilities are determined in the field.

The PAM system 117 can generate credentials, such as usernames and passwords. The controller 115/plug-in 114 can determine rules for generating passwords (or usernames where applicable) based on credential data 118 and potentially other configurable settings. The controller 115/plug-in 114 can utilize the rules to set the credential generation policy with the PAM system 117 for credentials that correspond to a specific device 110. The PAM system 117 can enforce rules for generating credentials, such as, for example, password and username policies. The policies can include a frequency for changing the credential.

As another example, the PAM system 117 can regularly initiate updating a security component of a credential for each device 110. The management system 103 is operative for controlling various settings and properties of the PAM system 117 by which credentials are generated. In one example, the management system 103 determines a password policy and sets a respective password policy for each of the credentials in the PAM system 117 that are mapped to devices 110 based on data mapping between the credentials and devices 110. The mappings can be stored in credential data 118.

The PAM system 117/controller 115 can initiate roll-forward or rollback processes for determining a current version of credentials for identifying a version of credentials allowing the controller 115 to access a device 110. The PAM system 117 can automatically, or in response to a request, enforce changes or initiate updates to credentials for each device 110 via the plug-in 114 and controller 115. For example, the PAM system 117 can generate a new credential after an existing credential has expired. The plug-in 114 can receive a request to change the credential. The plug-in 114 can communicate the change to the controller 115, and the controller 115 can determine a particular device 110 that utilized the credential and initiate changing of the credential on the particular device 110. In some embodiments, the plug-in 114 may correspond to software provided by the management system 103 to interface with the PAM system 117. In other embodiments, the PAM system 117 may include the functionality of the plug-in 114 directly rather than the functionality being in a plug-in.

The PAM system 117 can include one or more databases for securely storing credentials. For credentials that are generated for or assigned to the management system 103, the PAM system 117 can transmit various requests to the management system 103 to cause various functions and services to be executed thereby. In one example, from the PAM system 117, the management system 103 receives a request to change a security component of a credential that corresponds to a particular device 110 of a particular device family and, in response, the management system 103 determines a credential change profile corresponding to the particular device 110 and particular device family and initiates the changing of the security component of the credential. The management system 103 can update the credential data 118 and the PAM system 117 following a change to one or more components of the credentials.

The controller 115 can determine that one or more devices are acting in an unexpected manner. The profile data 127 or version data 121 can include expected behavior for each device 110, each firmware version, or each family of devices. The expected behavior may include expected responses to specific messages or queries, expected available properties and settings or unavailable properties and settings, expected network communications, expected response timings, expected message or packet formats, and other expected behavior. As an example, the controller 115 may determine that a specific field of a header in a message does not contain a proper checksum of the header contents. As another example, the controller 115 may determine that WiFi is disabled for a particular device 110 that should not allow further WiFi configuration while disabled but that WiFi properties are still being indicated as configurable. The controller 115 may determine that a particular device is not sending expected data to a cloud-based external system as expected or that a device is sending unexpected data to external systems. The controller 115 may determine that port 110 is enabled for a particular device 110 that the profile data 127 or version data 121 indicates should not be used by the particular device 110.

When the controller 115 determines that a particular device 110 is operating in an unexpected manner, the controller 115 can perform one or more remedial actions. Similarly, the controller 115 can take one or more remedial actions when changing a credential fails, when changing a firmware image fails, when interrogating a device 110 fails, when adjusting a configuration of a device 110 fails, or when other steps or processes discussed herein fail to complete successfully. The remedial actions can include initiating a firmware image change or reinstall of a same firmware image via process 400, change a credential via process 500, or perform some other action. The remedial actions can include adding a firewall rule to network equipment to prevent unexpected network traffic from being delivered or adjusting one or more settings of the network equipment to prevent the particular device 110 from accessing the network at all. The remedial action can include generating a message on a user interface (e.g., interface 600 or similar), transmitting an alert to an administrator, or provide some other notification. The remedial action can involve submitting a request to a manufacturer of the management system 103 such that the manufacturer can test the behavior in a lab and potentially add additional profile information to the data store 112 if the behavior is confirmed as valid.

Figure 3:
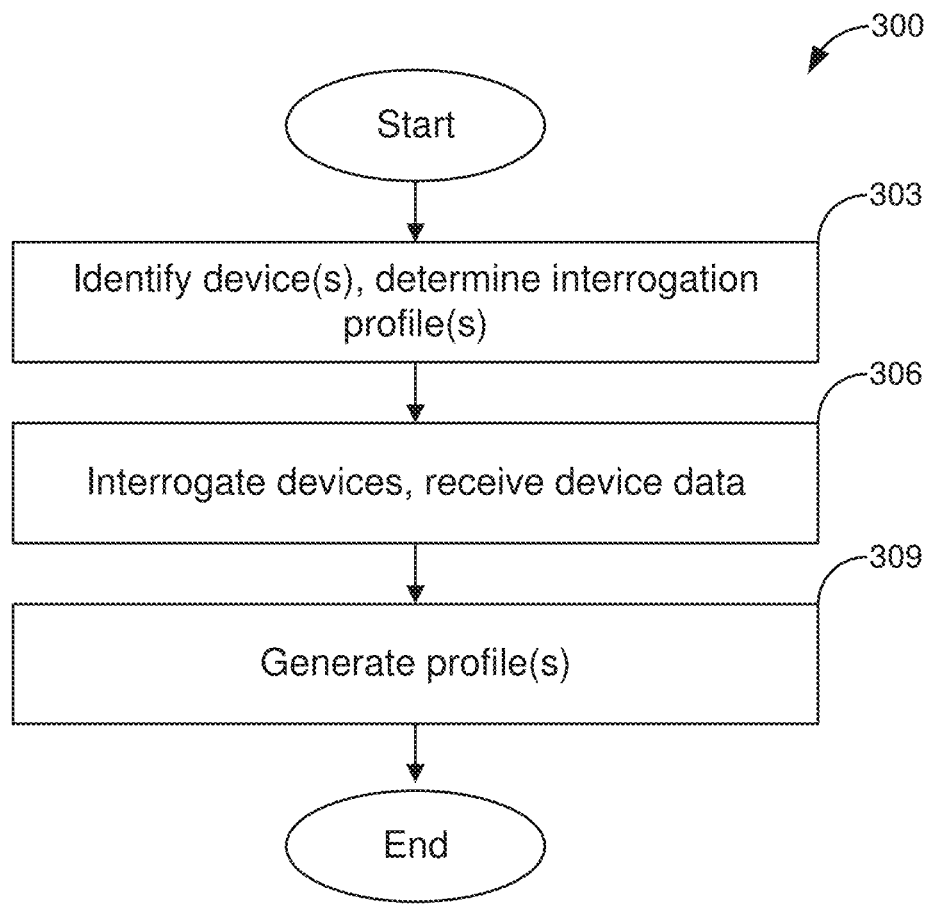
FIG. 3 is a flowchart of an exemplary interrogation process according to one embodiment of the present disclosure.

As will be understood by one having ordinary skill in the art, the steps and processes shown in FIG. 3 (and those of all other flowcharts and sequence diagrams shown and described herein) may operate concurrently and continuously, are generally asynchronous and independent, and are not necessarily performed in the order shown.

FIG. 3 shows an interrogation process 300 performed by the management system 103. In some embodiments, the interrogation process 300 (or a subset of steps therein) can be generally referred to as deep asset identification. The interrogation process 300 can be initiated automatically or manually, for example, in response to a request or user command. In one example, an interface 600 (FIG. 6) includes a selectable field that, upon selection, automatically initiates the interrogation process 300. In another example, whenever a list of devices 110 is rendered on a user interface, the management system 103 can perform interrogation process 300 to ensure the data shown is up-to-date. In some embodiments, the management system 103 may show a current value on the user interface and update the value once the interrogation process 300 is complete or once an updated value is available. The management system 103 can be configured to perform the interrogation process 300 on a periodic basis, such as, a weekly, monthly, quarterly basis.

At step 303, one or more devices 110 are identified and an interrogation profile 127 is determined for each device 110. The management system 103 may utilize a network scanner to identify all computing devices connected to the network 109. As one example, the network 109 may correspond to a local area network of a company with addresses assigned by a dynamic host configuration protocol (DHCP) server between 10.0.0.2 and 10.0.15.254. The management system 103 can connect to the DHCP server to determine the range of network addresses, connect to the DHCP server to obtain a list of clients currently on the network, a list of clients assigned a network address lease that has not yet expired, and/or to obtain other configuration information for the network. The management system 103/network scanner can iterate through the network addresses (e.g., 10.0.0.2 followed by 10.0.0.3) and attempt connections to each network address. The connections can include sending a ping, opening a socket connection to a particular port, sending a TCP (Transmission Control Protocol) or UDP (User Datagram Protocol) packet, using UPNP (universal plug and play) or some other type of connection. The management system 103/network scanner can iterate through each port number to identify which ports are open on each network address. The management system 103 can receive or generate a data set describing network addresses and sets of port numbers for each network address that correspond to a computing device of some sort. The management system 103 can determine whether each computing device corresponds to an IoT device 110, e.g., by comparing a MAC address against assigned MAC address ranges for various manufacturers or through other identified information or interrogated information determined in step 306.

Identifying a device 110 can include, for example, determining device information including, but not limited to, a make, model, and/or manufacturer of the device 110. The management system 103 can apply a machine learning to the data received from the device to estimate an identity of a device. For example, the management system 103 can train and execute a machine learning model for classifying a device 110 into a device family or predicting that the device 110 corresponds to particular device information in the data store 112. Thus, in various embodiments, the management system 103 can learn and leverage information from previous processes to identify and access (e.g., and subsequently configure updates for) devices 110 of any type. When an estimated device family is identified, the management system 103 can test whether the device 110 is from the estimated device family-based performing known requests and responses for the device family.

An interrogation profile 127 can be determined for each of the devices 110. The interrogation profile 127 can include, but is not limited to, one or more credential or password policies, default credentials, and other information utilized for accessing a device 110. The interrogation profile 127 can include a library of classes (e.g., instantiable data objects) operative for supporting the accessing of a corresponding device 110 by the management system 103. In one example, the interrogation profile 127 includes a web-based class, such as an HTTP or hypertext transfer protocol secure (HTTPS) class, that, when instantiated, allows the management system 103 to interrogate the device 110 using a particular web-based API 111. The management system 103 can use the web-based class to parse the responses to the web-based requests to extract data from web-based content. Credentials can be requested from the PAM system 117 based on credential data 118 (e.g., using a credential identifier stored in credential data 118). The management system 103 can authenticate with the device 110 to obtain and potentially set additional data, such as device configuration and options, current firmware, hardware versioning, and other data.

In some embodiments, all devices 110 from a particular device family can utilize a common interrogation profile

127. On initial interrogation, one or more default credentials associated with each device family or each device 110 can be identified, and the one or more default credentials can be used to authenticate the identity of each device 110 (e.g., corresponding to one of the respective device families). In some embodiments, a user may be asked to provide initial credentials for newly added devices 110 when the default credentials do not work (e.g., if a user has already changed the password). The user may be requested to perform a factory reset of the device if the credentials do not work.

In some embodiments, a particular interrogation profile 127 for a particular device 110 can be selected from a larger profile 127 that includes the particular interrogation profile 127 as well as other interrogation profiles 127 that correspond to other devices 110 of the device family. In at least one embodiment, a first interrogation profile 127 may be determined that corresponds to the device family and a second interrogation profile 127 may be determined that corresponds to the device 110. In one example, a first interrogation profile 127 is generated upon determination of the device family corresponding to the device 110 and a second interrogation profile 127 is generated upon authentication of an identity of the device 110 (e.g., via verification of a digital signature or hash generated from identification data 124 associated with the device 110). In one embodiment, a first interrogation profile 127 may be determined that corresponds to unauthenticated interrogation of devices 110 of a device family and a second interrogation profile 127 may be determined that corresponds to the authenticated interrogation of devices 110 of a device family.

At step 306, each device 110 is interrogated according to the corresponding interrogation profile 127. Interrogation can occur via one or more APIs 111. In some embodiments, the management system 103 can interrogate a device 110 in a variety of manners to determine the correct interrogation profile 127. Devices 110 of dissimilar device families can be performed using different APIs 111. It can be appreciated that the APIs 111 can include other forms of interfaces, such as SSH protocols, web-based protocols, proprietary protocols, etc. Further, while the API 111 is shown as part of the device 110, the API may involve the management system 103 communicating with another device, such as, for example, a cloud-based service from the manufacturer. For example, a device 110 of a first device family can be interrogated over an API 111A and a second device 110 of a second device family can be interrogated over a second API 111B, where the API 111B and the API 111A are different. Each and every port of a device 110 can be pinged even if, for example, the device 110 is known to only utilize a subset of a plurality of ports configured thereon.

Interrogation can include accessing and recording various configuration screens and interfaces of the device 110, the recorded information is generally referred to as device data. Interrogation can include determining various information from the device data including, but not limited to, a list of open network ports, settings, configuration properties (e.g., including indications of available and unavailable configuration properties), current values of configuration properties, and configuration options, and current versions of various device aspects such as firmware, credential policy profiles, available hardware components, modules, and security components. Interrogation can include accessing a sequence of interfaces or information screens of the device 110. Interrogation can include identifying any peripheral devices coupled to the device 110, such as external storage devices, input/output devices, display devices, hardware security devices, etc.

In one embodiment, the interrogation can include determining external addresses and corresponding properties that the device 110 is configured to communicate with. As an example, the device 110 may be configured to communicate with a Network Time Protocol server, utilize a manufacturer's service (e.g., cloud-based video access and storage for a camera, temperature configuration for a thermostat, etc.), or communicate with other similar or dissimilar devices 110 on a local network (e.g., light switches configured to communicate to form a three-way switch). In one example, the management system 103 provides credentials (e.g., from a PAM system 117) via the API 111 for the device 110 and, upon accessing authenticated data (e.g., via an information screen), the management system 103 automatically records all information included therein.

Configuration properties include, for example, access policies, device discovery or visibility properties, communication policies, data sharing policies, security policies, and other policies. Configuration properties can also be referred to generally as settings including mutable and immutable properties or key/value pairs. Current values of configuration properties can be determined, for example, by querying a corresponding device 110. In one example, a device discovery policy includes a value that causes the device to be discoverable to other devices on the network or via other communication modes such as Bluetooth or a cellular network.

In one embodiment, the management service 103 can determine all programs installed on and executed on the device 110 as part of the interrogation. As an example, the management service 103 may utilize an SSH API 111 to SSH into the device and perform a recursive directory listing to determine all files on the device 110. Further in this example, the "top" command may be issued to determine all currently executing processes. In one embodiment, the management service 103 can install a local service on the device to collect and report additional information. The local service may be installed using a package system, such as Yellowdog Updater (YUM) or the Advanced Package Tool (APT) or downloaded and executed. The local service may report to the management service 103 when configurations are changed or new applications are installed or executed. In some embodiments, the management service 103 can interrogate for a subset of properties based on a current value of another property and the interrogation profile. As an example, the management service 103 may interrogate properties of a web-server on a device 110 in response to determining that Apache is installed and executed on the device 110.

At step 309, based on device data from the interrogations, the management service 103 generates a device profile 127 for each device 110 and/or for each device family. The device profile 127 can include the device data and/or information determined therefrom. In one example, the device profile 127 includes a table of ports and an indication as to whether each port is enabled or disabled. In another example, the device profile 127 includes (or defines) a current version of firmware and current values of configuration properties installed and configured on the device 110. The device profile 127 can include configuration options for each configuration property (e.g., along with a currently configured option or value of the property). In some embodiments, the controller 115 determines a version of firmware, configuration properties, credential settings, or other information by comparing the version thereof in the device data to version data 121 and identifying matching versions based on the comparison. For example, the management service 103 can obtain a firmware image in the device data, compare the firmware image to a blockchain ledger store of firmware versions, and determine the version of the firmware image or whether the firmware image has been modified based on the comparison by matching the firmware image to a corresponding firmware version. Each device profile 127 can be stored in the data store 112.

Figure 4:
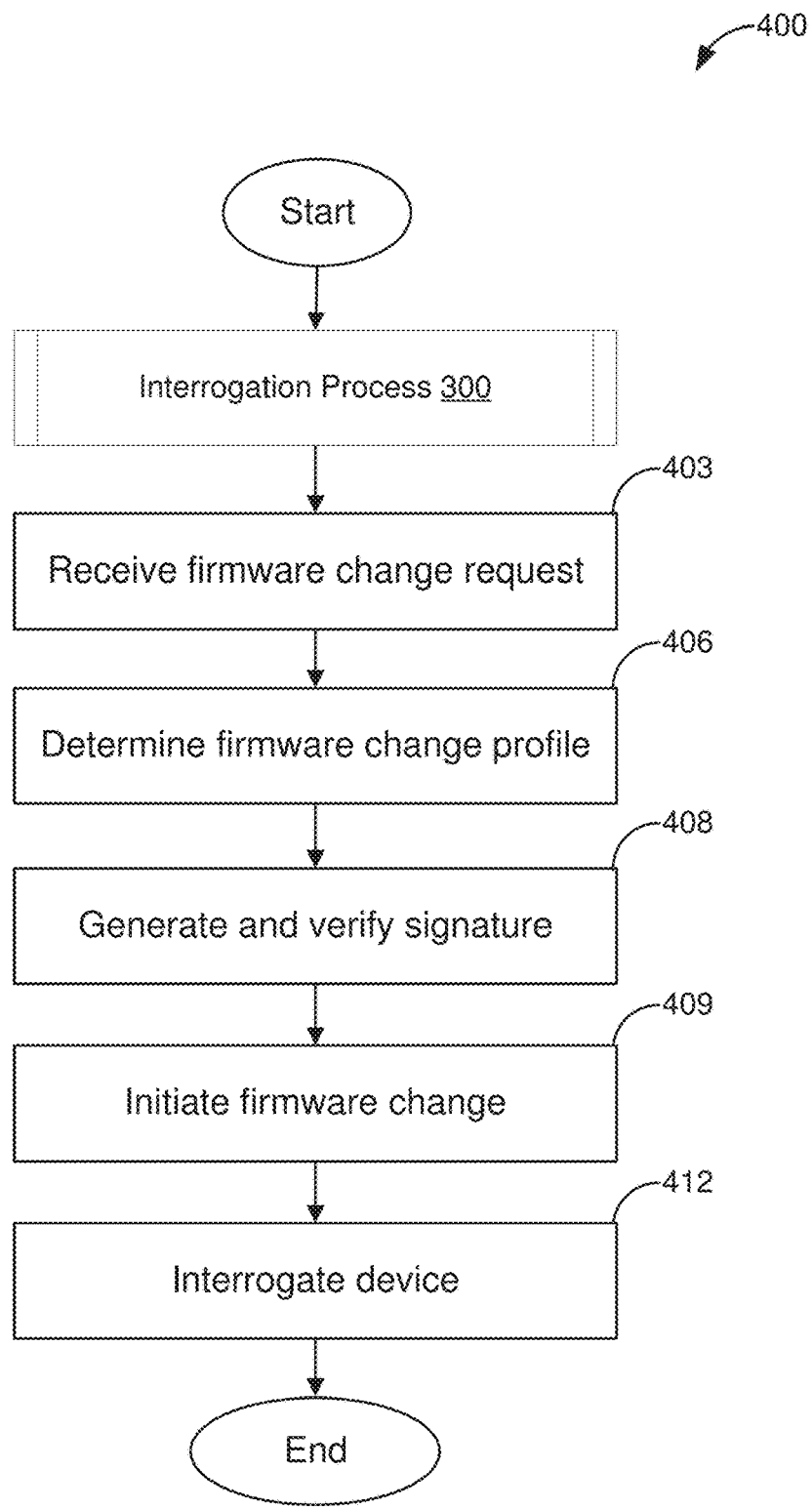
FIG. 4 is a flowchart of an exemplary firmware change process according to one embodiment of the present disclosure.

FIG. 4 shows a firmware change process 400 by the management system 103. In some embodiments, the firmware change process 400 (or a subset of steps therein) is generally referred to as a managed update process. In one or more embodiments, the firmware change process 400 is performed as a roll-forward or rollback process for updating devices 110 to a particular version of firmware, which may allow for additional firmware changes to be initiated on the devices 110. The firmware change process 400 can be initiated automatically, for example, in response to a request or user command. In some embodiments, the firmware change process 400 is automatically performed following performance of an interrogation process 300. In one example, upon the management system 103 determining that a current version of firmware on a device 110 does not correspond to a most-current version of firmware for the corresponding device family, the management system 103 automatically initiates the firmware change process 400. The management system 103 can be configured to perform the firmware change process 400 on a periodic basis, such as, a weekly, monthly, quarterly basis.

The management 103 system can execute the process 400 on a single-device basis, a device-family basis, or a system-wide basis to initiate updates to credentials across multiple device families and to each of the various types of devices 110 types therein. Thus, in the proceeding steps of the process 400, the management system 103 can perform actions described with respect to a particular device 110 of a particular device family, to each device 110 of the particular device family, or to a plurality of devices 110 across multiple device families.

In some embodiments, the management system 103 performs an interrogation process 300 in which a device 110 is identified and for which device data is obtained and used to generate a device profile 127. From the interrogation process 300, the management system 103 can identify a device family associated with the device 110 and retrieve device data for supporting the determination of change profiles 127 for changing the firmware (or other aspects) of the device 110. The interrogation process 300 can occur prior to receipt of a request at step 403, or can occur in response to the request (e.g., the request indicating a particular device 110 to be interrogated).

At step 403, the management system 103 determines that the firmware of a device 110 needs to be changed. The management system 103 can receive a request to change firmware of a device 110. The management system 103 can perform a scheduled update to the firmware for the device 110 or identify that a security vulnerability has been identified for a current version and generate a request to change the firmware of the device 110. The request can include an identification of the device 110, such as, for example, a network address or other identification data 124. The request can include version data 121 or other information corresponding to a particular version of firmware to which the firmware of the device 110 is to be changed. In some embodiments, the request does not include an indication of a particular firmware version and, instead, the management system 103 automatically determines the version (e.g., as described in other steps of the process 400). The request can be received from a webpage or an account, such as an administrator or user account, in control of the device 110 or the network 109. The request can be automatically generated, for example, based on a predetermined schedule for securing the device 110 or based on a determination that a current version of firmware on the device 110 is unsecure or does not correspond to a most-secure (e.g., most-recently released) version.

At step 406, a change profile 127 is determined for the device 110 or a device family associated therewith. Determining the change profile 127 can include identifying an API 111 that can be used to perform firmware updates. The management system 103 can identify and obtain credentials to authenticate with the device 110 prior to initiating the firmware update to allow the management system 103 to initiate a firmware change. In one example, credential data 118 is retrieved based on version data 121 corresponding to the device 110 (e.g., to device data received therefrom). The credential data 118 can be used to request credentials from the PAM system 117. For example, the credential data 118 can include credential policies or other rules parametrizing the generation of the credentials by the PAM system 117. The change profile 127 can include the credential data 118, but does not include the credentials themselves (e.g., the actual credentials are never stored in the data store 112). In some embodiments, if authentication of the credentials fails, the management system 103 may initiate the credential change process 500.

Determining the change profile 127 can include identifying a particular firmware version in version data 121 to which the device 110 will be upgraded. In some embodiments, one or more intermediary firmware versions can be identified, the one or more intermediary firmware versions being required, for example, in instances where a direct change from a first firmware version (e.g., configured on the device 110) to a second firmware version is not feasible. In one example, the management system 103 can retrieve a mapping of firmware versions in a blockchain ledger store and identifies the first firmware version, the second firmware version, and one or more intermediary firmware versions therebetween. The change profile 127 can include a table or other storage object listing the various firmware versions to which the device 110 will be changed.

In some embodiments, determining a change profile 127 includes analyzing device data and determining one or more vulnerabilities based on the analysis. Based on the one or more vulnerabilities, the management system 103 can configure a change profile 127 to include one or more upgrades or changes to firmware or other configuration properties to rectify the one or more vulnerabilities. In one example, the controller 115 compares device data (including configurations of a device 110) to a data store of vulnerable configurations and identifies one or more vulnerabilities of the device 110 based on the comparison. Upgrades can include, for example, disabling or enabling a particular setting or modifying a particular configuration property to rectify (or at least reduce) a vulnerability associated therewith.

The change profile 127 can include an upgrade path or upgrade procedure defining a sequence by which the firmware of the device 110 (e.g., the first version) can be changed to the second version, for example, by first changing the firmware to one or more intermediary versions. The management system 103 can determine an upgrade path, for example, based on the first firmware version, the second firmware version, and the other information included in the change profile 127, such as a mapping of firmware versions from version data 121. The change profile 127 can correspond to the particular device 110, or may correspond to the device family associated therewith. Thus, in various embodiments, the change profile 127 can be used to change firmware of each device 110 corresponding to the device family with which the change profile 127 is associated.

At step 408, a signature of the firmware image of the device 110 is generated and verified, for example, against device data and/or version data 121 corresponding to one or more versions of the firmware (e.g., as represented in version data 121). The signature generation and verification can be used to determine whether or not the firmware image is approved to be installed on the device 110 (e.g., that the firmware image wasn't tampered with). The signature generation and verification can be used to confirm the changing of the firmware image of the device 110 occurred successfully and to completion.

The firmware image of the device 110 can be stored in the data store 112, for example, in a blockchain ledger store. The management system 103 can generate and verify a hash associated with the firmware image. In one example, the management system 103 generates and verifies a hash associated with the firmware image in a blockchain ledger store of version data 121. In the same example, based on a successful verification, the changing of the firmware image is initiated. In an alternate example, in response to a failed verification, the change profile 127 and other information associated with the uncompleted change are stored in data store 112.

At step 409, the management service 103 initiates changing of the firmware image of the device 110 to the second firmware image. Initiating the change can include requesting credentials from the PAM system 117 based on credential data 118 of the change profile 127. The management system 103 can use the credentials received from the PAM system 117 to authenticate with the device 110 (and/or an API 111 associated therewith) to enable the changing of the firmware from a first version to a second version. The changing of the firmware image can be performed according to one or more of the first firmware version, the second firmware version, the change profile 127, and an upgrade path between the first and second firmware versions (e.g., and including one or more intermediary firmware versions).

In one example, the management system 103 can verify a signature of the firmware image to confirm the second firmware image has not been tampered with prior to installing. The management system 103 can check that the second firmware image was signed by a trusted authority, matches some predetermined characteristics (e.g., that the second firmware image matches an expected size), that the second firmware image was received from a particular trusted source, or perform some other verifications. The management system 103 may verify the second firmware image against a blockchain ledger before proceeding or download the second firmware image from the blockchain ledger.

The management system 103 can initiate the download process by sending a request to download the second firmware image via the API 111 of the device 110. In some embodiments, the management system 103 can transmit the second firmware image to the device 110 via the API 111. In other embodiments, the management system 103 can include a file server, such as a file transfer protocol (FTP) or a secure FTP (SFTP) server. The management system 103 can store the second firmware image on the file server and send a link to the second firmware image on the file server to the device 110 via the API.

In one embodiment, the firmware is provided by a manufacturer, and the management system 103 can submit a request via the API 111 to contact the manufacturer for an update to a particular version. As one example, a web page interface for a thermostat device 110 may include an upgrade firmware option, where the software on the device 110 automatically downloads and installs the firmware from the manufacturer when the option is selected. In this example, based on the change profile 127, the management system 103 can connect to the web page interface and initiate the software upgrade process. In another example, the API 111 for a device 110 can correspond to an SSH connection (or similar shell or terminal connection), and the management service 103 can SSH into the device 110 to perform the firmware update. In this example, the firmware update can be installed based on operating system update commands, wget command, FTP or FTPS commands, or other file transfer commands and execution commands.

In some embodiments, the device 110 can store more than one firmware image such that the management system 103 can cause a download of the second firmware image, verify that the download was successful (e.g., verifying a hash or signature of the second firmware image or a size), and instruct the device 110 to switch to the second firmware image once verified.

At step 412, the management system 103 can interrogate the device 110 after the firmware change is completed, for example, by performance of an interrogation process 300. A current firmware version (e.g., the second firmware version) can be determined based on device data from the interrogation. The current firmware version can be compared to the second firmware version. In response to determining that the current firmware version matches the second firmware version, the version data 121 or other record of firmware running on the device 110 can be updated to indicate the current firmware version. By interrogating the device 110, the management system 103 can verify that the firmware update was successfully completed prior to updating the version data 121 in the data store 112.

In some embodiments, the device 110 is interrogated prior to the initiation of the changing of the firmware (e.g., between steps 403 and 406, 406 and 409, or at another point in the process 400). In one example, following receipt of the request that specifies a target firmware version, the corresponding device 110 is interrogated according to an interrogation profile 127 corresponding to the device 110 and/or a device family thereof. In the same example, based on the data received during the interrogation (and potentially data previously received from interrogating the device 110), the management service 103 confirms that the expected firmware version (e.g., the first version) is currently installed on the device 110. If another version is installed on the device 110, the management system 103 can generate a new upgrade path, confirm the upgrade with a user, cancel the upgrade, or restart the process 400.

Figure 5:
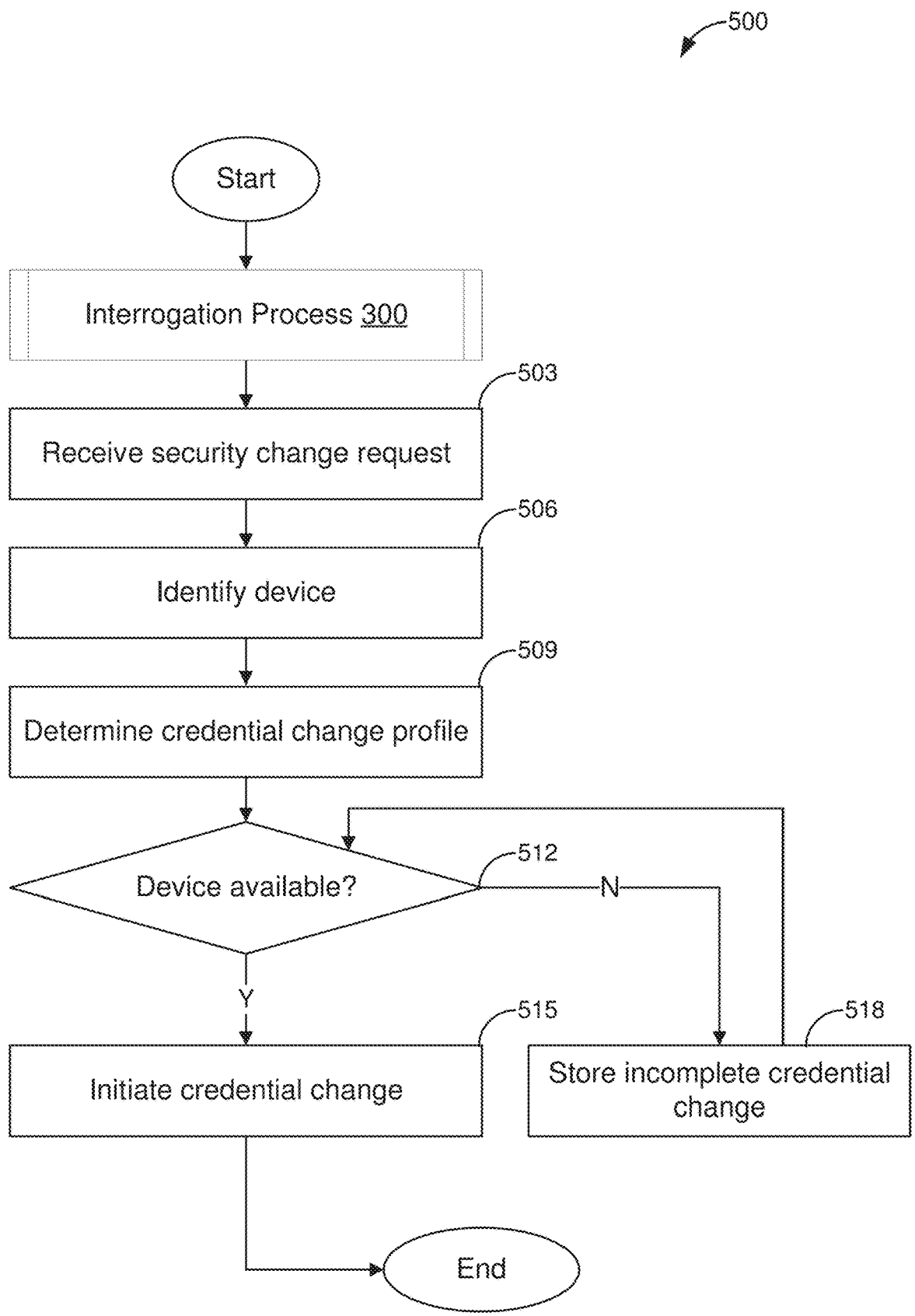
FIG. 5 is a flowchart of an exemplary credential change process according to one embodiment of the present disclosure.

FIG. 5 shows a credential change process 500 performed by the management system 103. In some embodiments, the credential change process 500 (or a subset of steps therein) is generally referred to as a credential management process. The credential change process 500 can be initiated automatically, for example, in response to a request or user command. The PAM system 117 can initiate the credential change process 500, for example, by causing a plug-in 114 to transmit a request to the management service 103. In some embodiments, the credential change process 500 can include performing an interrogation process 300 before changing the credentials. In one example, upon the management system 103 determining that a current version of credentials on a device 110 does not adhere to a particular version of credentials policies and rules for the corresponding device family, the management system 103 can initiate the credential change process 500. The management system 103 can store a last known credential for each device 110 in the credential data 118.

In one example, the management system 103 can attempt to access the device 110 using a default credential corresponding to a device family if the current credential does not work or if the device 110 is newly added. In the same example, upon the successful use of the default credential for accessing the device 110, the management system 103 automatically initiates the credential change process 500 to change the credential and secure the device. The management system 103 or PAM system 117 can be configured to perform the credential change process 500 on a periodic basis, such as, a weekly, monthly, quarterly basis. For example, to promote security, the management system 103 can configure the PAM system 117 to initiate changes of the credentials on a set of devices 110 every six weeks and according to various credential policies and other password policies. The PAM system 117 may be device 110 agnostic, where the management system 103 maps the credentials stored in and changed by the PAM system 117 to the specific devices 110. As such, when a new device 110 is discovered and added to the management system 103, the management system 103 can generate a new credential in the PAM system 117 and store the identifying information for the new credential associated with the new device 110 in credential data 118.

The management 103 system can execute the process 500 on a single-device basis, a device-family basis, or a system-wide basis to initiate updates to credentials across multiple device families and to each of the various types of devices 110 types therein. Thus, in the proceeding steps of the process 500, the management system 103 can perform actions described with respect to a particular device 110 of a particular device family, to each device 110 of the particular device family, or to multiple devices 110 across multiple device families.

In some embodiments, the management system 103 performs an interrogation process 300 in which a device 110 is identified and for which device data is obtained and used to generate a device profile 127. From the interrogation process 300, the management system 103 can identify a device family associated with the device 110 and retrieve device data for supporting the determination of change profiles 127 for changing the credentials of the device 110. The interrogation process 300 can occur prior to receipt of a request at step 503, or can occur in response to the request (e.g., the request indicating a particular device 110 to be interrogated). Similar to the process 400, the management system 103 can perform steps of the process 500 with respect to a particular device 110 of a particular device family and can perform a corresponding and similar version of the steps with respect to other devices 110 of the same device family and devices 110 of other device families.

At step 503, the management system 103 determines that the credentials of a device 110 are to be changed. The request can be for a changing of the overall credentials for the device 110, or for a subset of the credential. For example, the request can be for a changing of a security component of the credentials, such as a password or cryptographic key. In some embodiments, the request is for changing of credentials for all devices 110 corresponding to a device family. For example, a request can be received for the changing of credentials for all wireless printers connected to the network 109. In some embodiments, the request can include an identification of the device 110, such as, for example, a network address or other identification data 124.

In other embodiments, the request can exclude any identifying information for the device 110, rather including identifying information for the credential. As an example, upon initialization of a particular device 110, the management system 103 can generate rules for credential generation and request a new credential from the PAM system 117. In this example, the PAM system 117 can securely store the credential in a secure data store and transmit an identifier for the credential to the management system 103. In this example, the management system 103 can store the identifier associated with device identifying information in credential data 118. When a request to change the new credential is received from the PAM system 117 along with the identifying information, the management system 103 can determine the device 110 that corresponds to that credential based on the credential data 118. Stated differently, the request can include an identification of a particular credential from a mapping of credentials stored in credential data 118. The request can include version data 121 or other information corresponding to a particular set of credential policies or other rules by which a new credential of the device 110 is to be defined. In some embodiments, the request does not include an indication of particular credential policies and, instead, the management system 103 automatically determines an optimal set of credential policies (e.g., as described in other steps of the process 500).

The request can be received from the PAM system 117, for example, based on a predetermined schedule for updating credentials of the device 110 (and/or other devices 110 in the same device family). In one example, a plug-in 114 transmits the request upon the PAM system 117 initiating the process 500. The request can be received from a webpage or an account, such as an administrator or user account forcing a password change, in control of the device 110 or the network 109. The request can be automatically generated, for example, based on a predetermined schedule for securing the device 110 or based on a determination that a current credential associated with the device 110 is unsecure or does not correspond to a most-secure (e.g., most-recently released) set of credential policies.

At step 506, based on the request, a device 110 is identified. In one example, the device 110 is identified based on identifier data 114 included in or retrieved from processing the request. The management system 103 can identify the device 110 based on an identifier of the credential. The credential data 118 that stores the mapping from the device identifier to the credential identifier can exclude security components for the credentials, which instead are generated and stored at and retrieved from the PAM system 117. The management system 103 can register the credentials with the PAM system 117 (e.g., thereby allowing for generation and retrieval of security components corresponding to the credentials). In some embodiments, identification of the device 110 includes identifying a device family with which the device 110 is associated.

At step 509, a change profile 127 is determined for the device 110 or the device family associated therewith. Determining the change profile 127 can include identifying appropriate credential policies and password limitations associated with the device 110 to allow for a changing of the credentials (or a portion thereof). While the PAM system 117 may have the policy for generating credentials, in some embodiments, the management system 103 can verify that a credential to be set for a device 110 complies with the policy.

The credentials can be retrieved based on version data 121 corresponding to the device 110 (e.g., to device data received therefrom). For example, to upgrade from a first password to a second password, both the first and second password may be necessary. However, if the PAM system 117 updates the credentials but the credentials cannot be successfully updated on the device 110 (e.g., the device is powered off or unavailable), the management system 103 can store the last known credential identifier and a current credential identifier. If the device 110 becomes available, the management system 103 can update the credential. As an example, the management system 103 may determine that a device 110 has come online after a period of unavailability, and attempt to change from a last known credential to a current credentials thereby skipping three previous credential changes.

Determining the change profile 127 can include identifying a particular set of credential policies, APIs, and other rules that will be used to change the credentials of the device 110. Determining the change profile 127 can include identifying or generating a credential change protocol associated with the device 110 or the device family thereof. The credential change protocol can be a sequence of operations performed to update the credentials (or a security component thereof) of the device 110.

The change profile 127 can correspond to the particular device 110, or may correspond to the device family associated therewith. Thus, in various embodiments, the change profile 127 can be used to change credentials of each device 110 corresponding to the device family with which the change profile 127 is associated.

At step 512, the availability of the device 110 is determined. The availability of the device 110 can be determined by pinging the device 110 and determining that the device 110 is available based on the response (e.g., or any response) to the ping (or other type of request). The availability of the device 110 can be determined by querying a DHCP server, networking equipment, or other components on the network 109 to obtain network addresses and identifying that a network address corresponding to the device 110 is included therein. The management system 103 can query other services to collect information about various devices 110, such as, for example, identity management systems, mobile device management systems, cloud-based services, dynamic DNS systems, and other systems. The management system 103 can determine availability by initiating the credential change sequence and determining if the device 110 is responding to messages in the change process.

In response to determining that the device 110 is available, the process 500 can proceed to step 515. In response to determining that the device 110 is unavailable, the change profile 127 can be stored in the data store 112. In instances in which step 512 and step 515 occur substantially concurrently, a failure to change the credentials of the device 110 can serve as a determination that the device 110 is unavailable. In some embodiments, step 512 occurs repeatedly until the device 110 is determined to be available, at which point the change profile 127 and/or other data associated with an incomplete credential change can be retrieved and the process 500 progressed to step 515. In some embodiments, step 512 can occur repeatedly until a timeout occurs or the device 110 is available.

At step 515, the management system 103 can initiate changing the credential (or a security component thereof) of the device 110 is initiated. The changing of the credentials can be performed according to the protocol or API 111 specified in the change profile 127. The management system 103 can request the credentials, or a security component thereof, from the PAM system 117. The management system 103 can receive the credentials from the PAM system 117, and initiate setting of the credentials on the device 110. The management system 103 can set the credentials on the device 110 via the API 111 corresponding to the device. The changing of the credentials can be performed according to one or more of a first version of the credentials (e.g., the current credentials of the device 110 received from the PAM system 117), a second version of credentials (e.g., generated by the PAM system 117), and the change profile 127.

At step 518, the management system 103 stores the record of failure to change credentials. The identifying information for the credential is stored but the security information is omitted. The identifying information can be stored even if incomplete credential change can be completed because the device 110 is unavailable or the credential change of step 515 failing to proceed to completion. Storing the incomplete credential change can include storing a change profile 127 corresponding to the credential change, as well as information associated with the attempted credential change, such as, for example, a timestamp, reason for failure and etc.

Figure 6:
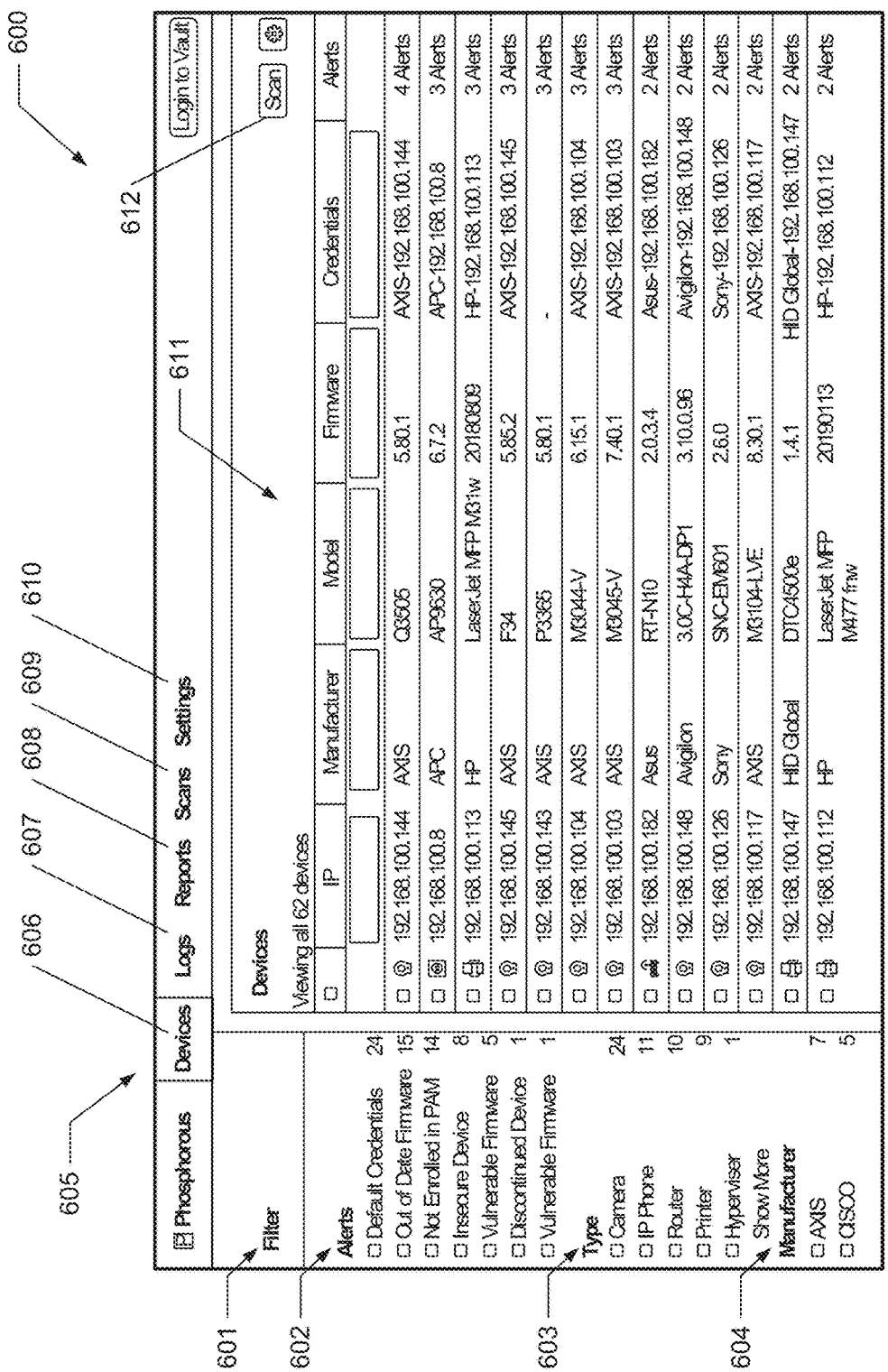
FIG. 6 is an exemplary interface according to one embodiment of the present disclosure.

FIG. 6 shows an exemplary interface 600 for controlling the management system 103 according to various embodiments of the present disclosure. The interface 600 can be rendered on a computing device associated with a user account authorized to access and control one or more functions of the management system 103. The interface 600 can be served to the computing device in response to a request, which is received, for example, upon the computing device accessing a particular networking address at which the interface 600 is hosted. The interface 600 can include filters 601 for accessing data associated with a plurality of devices 110. The filters 601 include, but are not limited to, alerts 602, types 603, and manufacturers 604. In some embodiments, the filters 601 include one or more filters corresponding to each of the one or more device families. Selection of a particular filter 601 can cause a window 611 to be updated to include information describing one or more devices 110 corresponding to the particular filter 601. In one example, a user account provides a selection of a filter 601 for "printers" that causes the window 611 to be updated with a plurality of device data, each of the plurality of device data being associated with a printer connected to a network 109 with which the user account is associated.

The interface 600 can include a plurality of tabs 605 for accessing various services, functions, and settings of the management system 103. The plurality of tabs can include a devices tab 606, a logs tab 607, a reports tab 608, a scans tab 609, and a settings tab 610. Selection of a tab 605 can cause the window 611 to be updated to include various information and/or selectable fields corresponding to the selected tab 605. For example, as shown in FIG. 6, selection of the devices tab 606 causes the window 611 to be updated to include information corresponding to devices 110 and as refined by selection of filters 601. In the same example, the window 611 includes a selectable field 612 that, upon being selected, causes one or more of the devices 110 represented in the window 611 to be scanned (e.g., which may include performing an interrogation process 300). In another example, selection of a settings tab 610 causes the window 611 to be updated to include a plurality of settings for controlling functions of the management system 103. In the same example, the window 611 includes selectable fields 612 for disabling, enabling, or modifying the settings, such as a selectable field 612 for controlling schedules for performing firmware change processes 400 and credential change processes 500 on devices 110 or particular device families.

Figure 7:
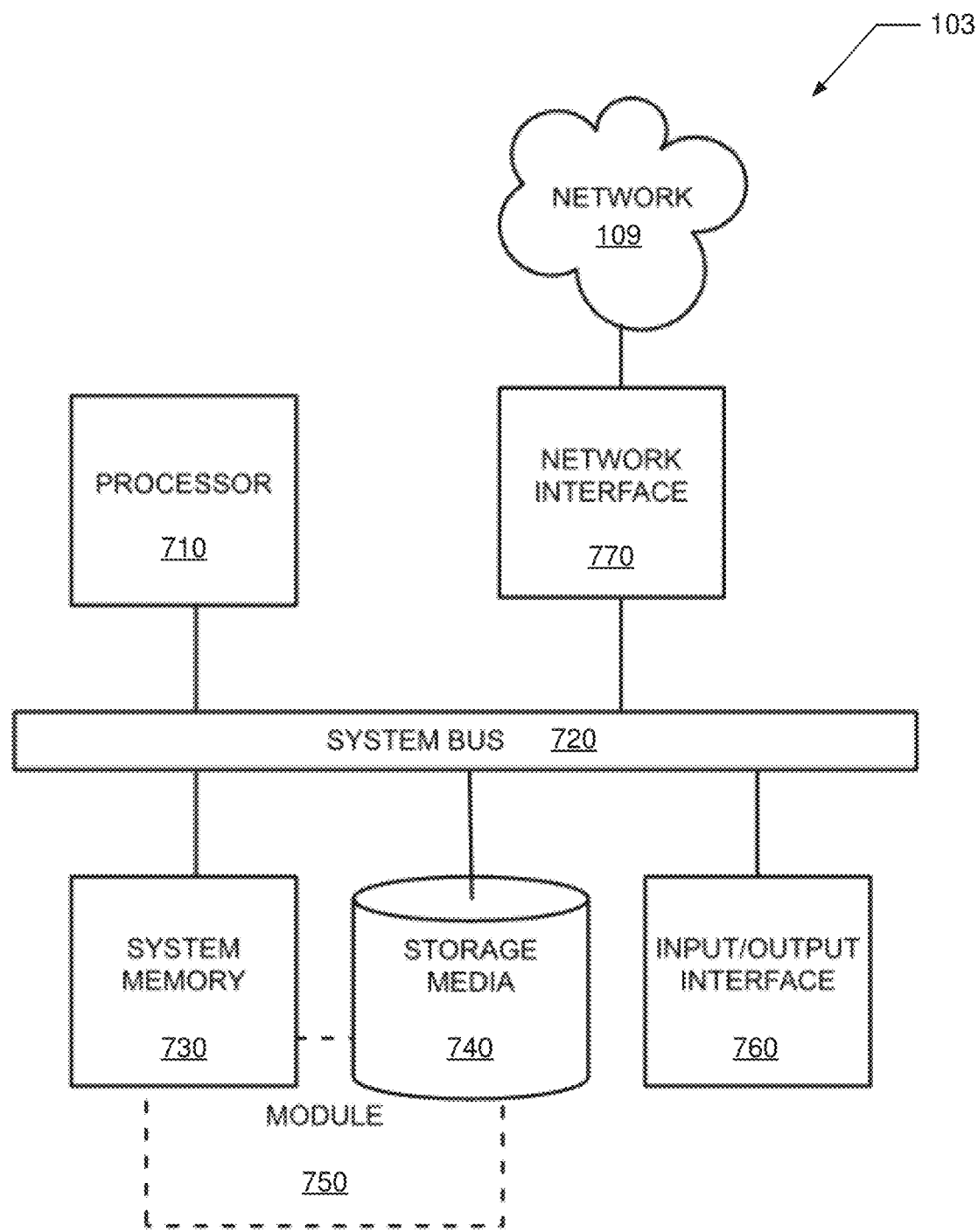
FIG. 7 shows a diagram of a computing device according to one embodiment of the present disclosure.

FIG. 7 shows an exemplary diagram of various elements included in at least one embodiment of the management system 103. For example, FIG. 7 depicts a computing machine 700 and a module 750 in accordance with one or more embodiments presented herein. The module 750 may comprise one or more hardware or software elements configured to facilitate the computing machine 700 in performing the various methods and processing functions presented herein. The computing machine 700 may include various internal or attached components such as a processor 710, system bus 720, system memory 730, storage media 740, input/output interface 760, and a network interface 770 for communicating with a network 109.

The computing machine 700 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 700 may be a distributed system configured to function using multiple computing machines interconnected via a data network or bus system.

The processor 710 may be configured to execute code or instructions to perform the operations and functionality described herein, manage request flow and address mappings, and to perform calculations and generate commands. In some embodiments, the controller 115 includes one or more of the processor 710. The processor 710 may be configured to monitor and control the operation of the components in the computing machine 700. The processor 710 may be a general-purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 710 may be a single processing unit, multiple processing units, a single processing core, multiple processing cores, special purpose processing cores, co-processors, or any combination thereof. According to certain embodiments, the processor 710 along with other components of the computing machine 700 may be a virtualized computing machine executing within one or more other computing machines.

The system memory 730 can comprise the data store 112. The system memory 730 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 730 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 730. The system memory 730 may be implemented using a single memory module or multiple memory modules. While the system memory 730 is depicted as being part of the computing machine 700, one skilled in the art will recognize that the system memory 730 may be separate from the computing machine 700 without departing from the scope of the subject technology. It should also be appreciated that the system memory 730 may include, or operate in conjunction with, a non-volatile storage device such as the storage media 740.

The storage media 740 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 740 may store one or more operating systems, application programs and program modules such as module 750, data, or any other information. The storage media 740 may be part of, or connected to, the computing machine 700. The storage media 740 may also be part of one or more other computing machines that are in communication with the computing machine 700 such as servers, database servers, cloud storage, network attached storage, and so forth.

The module 750 may comprise one or more hardware or software elements configured to facilitate the computing machine 700 with performing the various methods and processing functions presented herein. The module 750 may include one or more sequences of instructions stored as software or firmware in association with the system memory 730, the storage media 740, or both. The storage media 740 may therefore represent examples of machine or computer readable media on which instructions or code may be stored for execution by the processor 710. Machine or computer readable media may generally refer to any medium or media used to provide instructions to the processor 710. Such machine or computer readable media associated with the module 750 may comprise a computer software product. It should be appreciated that a computer software product comprising the module 750 may also be associated with one or more processes or methods for delivering the module 750 to the computing machine 700 via the network 109, any signal-bearing medium, or any other communication or delivery technology. The module 750 may also comprise hardware circuits or information for configuring hardware circuits such as microcode or configuration information for an FPGA or other PLD.

In one or more embodiments, the interface 600 shown in FIG. 6 shows the input/output ("I/O") 760. The I/O interface 760 may be configured to couple to one or more external devices, to receive data from the one or more external devices, and to send data to the one or more external devices. Such external devices along with the various internal devices may also be known as peripheral devices. The I/O interface 760 may include both electrical and physical connections for operably coupling the various peripheral devices to the computing machine 700 or the processor 710. The I/O interface 760 may be configured to communicate data, addresses, and control signals between the peripheral devices, the computing machine 700, or the processor 710. The I/O interface 760 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 760 may be configured to implement only one interface or bus technology.

Alternatively, the I/O interface 760 may be configured to implement multiple interfaces or bus technologies. The I/O interface 760 may be configured as part of, all of, or to operate in conjunction with, the system bus 720. The I/O interface 760 may include one or more buffers for buffering transmissions between one or more external devices, internal devices, the computing machine 700, or the processor 710.

The I/O interface 760 may couple the computing machine 700 to various input devices including mice, touch-screens, scanners, biometric readers, electronic digitizers, sensors, receivers, touchpads, trackballs, cameras, microphones, keyboards, any other pointing devices, or any combinations thereof. The I/O interface 760 may couple the computing machine 700 to various output devices including video displays, speakers, printers, projectors, tactile feedback devices, automation control, robotic components, actuators, motors, fans, solenoids, valves, pumps, transmitters, signal emitters, lights, and so forth.

The computing machine 700 may operate in a networked environment using logical connections through the network interface 770 to one or more other systems or computing machines across the network 109. The network 109 may include wide area networks ("WAN"), local area networks ("LAN"), intranets, the Internet, wireless access networks, wired networks, mobile networks, telephone networks, optical networks, or combinations thereof. The network 109 may be packet switched, circuit switched, of any topology, and may use any communication protocol. Communication links within the network 109 may involve various digital or an analog communication media such as fiber optic cables, free-space optics, waveguides, electrical conductors, wireless links, antennas, radio-frequency communications, and so forth.

The processor 710 may be connected to the other elements of the computing machine 700 or the various peripherals discussed herein through the system bus 720. It should be appreciated that the system bus 720 may be within the processor 710, outside the processor 710, or both. According to some embodiments, any of the processor 710, the other elements of the computing machine 700, or the various peripherals discussed herein may be integrated into a single device such as a system on chip ("SOC"), system on package ("SOP"), or ASIC device.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a computer.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a computer to perform one specific function or a group of functions.

Those skilled in the art will understand the features and aspects of a suitable networked environment in which aspects of the disclosure may be implemented. Although not required, some of the embodiments of the claimed systems and processes may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the processes disclosed herein. The particular sequence of such executable instructions or associated data structures represent examples of corresponding acts for implementing the functions described in such steps.

Those skilled in the art will also appreciate that the claimed and/or described systems and processes may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed systems and processes are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems and processes are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the systems and processes is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and processes of the claimed systems and processes will be readily discernible from the description herein, by those of ordinary skill in the art. Many embodiments and adaptations of the disclosure and claimed systems and processes other than those herein described, as well as many variations, modifications, and equivalent arrangements and processes, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems and processes. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems and processes. In addition, some steps may be carried out simultaneously, contemporaneously, or in synchronization with other steps.

The embodiments were chosen and described in order to explain the principles of the claimed systems and processes and their practical application so as to enable others skilled in the art to utilize the systems and processes and various embodiments and with various modifications as are suited to the particular use contemplated. Alternative embodiments will become apparent to those skilled in the art to which the claimed systems and processes pertain without departing from their spirit and scope. Accordingly, the scope of the claimed systems and processes is defined by the appended claims rather than the foregoing description and the exemplary embodiments described therein.

Clause 1. A system comprising, a data store; and at least one computing device in communication with the data store, the at least one computing device being configured to at least: receive a plurality of network addresses corresponding to a plurality of internet of things (IoT) devices for a particular network; identify a plurality of IoT device families individually associated with at least one of the plurality of IoT devices; determine a plurality of interrogation profiles individually associated with each of the plurality of IoT device families; and interrogate the plurality of IoT devices over the network according to a corresponding interrogation profile of the plurality of interrogation profiles to determine respective device data for each of the plurality of IoT devices.

Clause 2. The system of clause 1 or any of the clauses contained herein, wherein interrogating the plurality of IoT devices comprises determining a respective list of open network ports for each of the plurality of IoT devices.

Clause 3. The system of clause 1 or any of the clauses contained herein, wherein interrogating the plurality of IoT devices comprises determining available configuration properties for each of the plurality of IoT device families and querying IoT devices associated with each of the plurality of IoT device families to obtain a current value for each of the available configuration properties.

Clause 4. The system of clause 1 or any of the clauses contained herein, wherein interrogating the plurality of IoT devices over the network comprises interrogating at least one IoT device of a first IoT device family using a first application programming interface (API) and interrogating at least one second IoT device of a second IoT device family using a second API, where the first API differs from the second API.

Clause 5. The system of clause 1 or any of the clauses contained herein, wherein the at least one computing device is further configured to: determine a plurality of default credentials associated with the plurality of device families; perform an authentication with each of the plurality of IoT devices using a respective one of the plurality of default credentials; determine a plurality of second interrogation profiles individually associated with each of the plurality of device families; and interrogate the plurality of IoT devices over the network based on a respective one of the plurality of second interrogation profiles and the authentication to determine respective authenticated device data for each of the plurality of IoT devices.

Clause 6. The system of clause 1 or any of the clauses contained herein, wherein the at least one computing device is further configured to generate a respective device profile for each of the plurality of IoT devices; and store the respective device profile for each of the plurality of IoT devices in the data store.

Clause 7. The system of clause 1 or any of the clauses contained herein, wherein the respective device data for each of the plurality of IoT devices comprises a plurality of configuration options.

Clause 8. The system of clause 1 or any of the clauses contained herein, wherein the plurality of IoT devices comprise at least one of a printer, a camera, a speaker, a thermostat, a smoke detector, a medical sensor, a microphone, a vehicle, a shopping cart, a lock, an appliance, or a robotic device.

Clause 9. A method comprising, receiving, via at least one computing device, a plurality of network addresses corresponding to a plurality of internet of things (IoT) devices for a particular network; identifying, via the at least one computing device, a plurality of IoT device families individually associated with at least one of the plurality of IoT devices; determining, via the at least one computing device, a plurality of interrogation profiles individually associated with each of the plurality of device families; and interrogating, via the at least one computing device, the plurality of IoT devices over the network according to a corresponding interrogation profile of the plurality of interrogation profiles to determine respective device data for each of the plurality of IoT devices.

Clause 10. The method of clause 9 or any of the clauses contained herein, wherein interrogating the plurality of IoT devices comprises determining available configuration properties for each of the plurality of IoT device families and querying IoT devices associated with each of the plurality of IoT device families to obtain a current value for each of the available configuration properties.

Clause 11. The method of clause 9 or any of the clauses contained herein, wherein interrogating the plurality of IoT devices over the network comprises interrogating at least one IoT device of a first IoT device family using a first application programming interface (API) and interrogating at least one second IoT device of a second IoT device family using a second API, where the first API differs from the second API.

Clause 12. The method of clause 9 or any of the clauses contained herein, further comprising: determining, via the at least one computing device, a plurality of default credentials associated with the plurality of device families; performing, via the at least one computing device, an authentication with each of the plurality of IoT devices using a respective one of the plurality of default credentials; determining, via the at least one computing device, a plurality of second interrogation profiles individually associated with each of the plurality of device families; and interrogating, via the at least one computing device, the plurality of IoT devices over the network based on a respective one of the plurality of second interrogation profiles and the authentication to determine respective authenticated device data for each of the plurality of IoT devices.

Clause 13. The method of clause 9 or any of the clauses contained herein, further comprising: generating, via the at least one computing device, a respective device profile for each of the plurality of IoT devices; and storing, via the at least one computing device, the respective device profile for each of the plurality of IoT devices in a data store.

Clause 14. The method of clause 9 or any of the clauses contained herein, wherein the respective device data for each of the plurality of IoT devices comprises a plurality of configuration options.

Clause 15. A non-transitory computer-readable medium embodying a program that, when executed by at least one computing device, causes the at least one computing device to at least: receive a plurality of network addresses corresponding to a plurality of internet of things (IoT) devices for a particular network; identify a plurality of IoT device families individually associated with at least one of the plurality of IoT devices; determine a plurality of interrogation profiles individually associated with each of the plurality of device families; and interrogate the plurality of IoT devices over the network according to a corresponding interrogation profile of the plurality of interrogation profiles to determine respective device data for each of the plurality of IoT devices.

Clause 16. The non-transitory computer-readable medium of clause 15 or any of the clauses contained herein, wherein interrogating the plurality of IoT devices comprises determining a respective list of open network ports for each of the plurality of IoT devices.

Clause 17. The non-transitory computer-readable medium of clause 15 or any of the clauses contained herein, wherein interrogating the plurality of IoT devices comprises determining available configuration properties for each of the plurality of IoT device families and querying IoT devices associated with each of the plurality of IoT device families to obtain a current value for each of the available configuration properties.

Clause 18. The non-transitory computer-readable medium of clause 15 or any of the clauses contained herein, wherein interrogating the plurality of IoT devices over the network comprises interrogating at least one IoT device of a first IoT device family using a first application programming interface (API) and interrogating at least one second IoT device of a second IoT device family using a second API, where the first API differs from the second API.

Clause 19. The non-transitory computer-readable medium of clause 15 or any of the clauses contained herein, wherein program further causes the at least one computing device to: determine a plurality of default credentials associated with the plurality of device families; perform an authentication with each of the plurality of IoT devices using a respective one of the plurality of default credentials; determine a plurality of second interrogation profiles individually associated with each of the plurality of device families; and interrogate the plurality of IoT devices over the network based on a respective one of the plurality of second interrogation profiles and the authentication to determine respective authenticated device data for each of the plurality of IoT devices.

Clause 20. The non-transitory computer-readable medium of clause 15 or any of the clauses contained herein, wherein the program further causes the at least one computing device to generate a respective device profile for each of the plurality of IoT devices; and store the respective device profile for each of the plurality of IoT devices in a data store.

Clause 21. A system comprising, a data store comprising data describing a plurality of internet of things (IoT) devices and a corresponding plurality of firmware versions; and at least one computing device in communication with the data store, the at least one computing device being configured to at least: receive a request to change firmware of a particular IoT device of the plurality of IoT devices from a first version to a second version over a particular network, the first version being specified in a corresponding one of the plurality of firmware versions; identify a particular IoT device family for the particular IoT device; determine a firmware change profile corresponding to the particular IoT device family; and initiate changing a firmware image of the particular IoT device to the second version over the network based on the firmware change profile.

Clause 22. The system of clause 21 or any of the clauses contained herein, wherein the at least one computing device is further configured to: subsequent to changing the firmware image, interrogate the particular IoT device over the network according to an interrogation profile corresponding to the particular IoT device family to determine a current firmware version; in response to the current firmware version matching the second version, update the corresponding one the plurality of firmware versions.

Clause 23. The system of clause 21 or any of the clauses contained herein, wherein the at least one computing device is further configured to: perform an interrogation the particular IoT device over the network according to an interrogation profile; and determine that the first version of the firmware is currently installed based at least in part on a formatting of responses to the interrogation.

Clause 24. The system of clause 21 or any of the clauses contained herein, wherein the at least one computing device is further configured to: generate a signature of firmware image; and verify the signature against the data describing the plurality of IoT devices and the corresponding plurality of firmware versions.

Clause 25. The system of clause 21 or any of the clauses contained herein, wherein the request is received via at least one of: a web page or a scheduled process.

Clause 26. The system of clause 21 or any of the clauses contained herein, wherein the at least one computing device is further configured to: determine an upgrade path for the particular IoT device based on the first version, the second version, and the firmware change profile; and prior to initiate changing of the firmware image the second version, initiate changing the firmware image of the particular IoT device to at least one intermediary version based on the upgrade path.

Clause 27. The system of clause 21 or any of the clauses contained herein, wherein the firmware image is stored in a blockchain ledger store and the at least one computing device is further configured to verify a hash associated with the firmware image in the blockchain ledger store prior to initiating changing of the firmware image.

Clause 28. A method comprising, receiving, via at least one computing device, a request to change firmware of a particular IoT device of a plurality of IoT devices from a first version to a second version over a particular network, the first version being specified in a corresponding one of a plurality of firmware versions; identifying, via the at least one computing device, a particular IoT device family for the particular IoT device; determining, via the at least one computing device, a firmware change profile corresponding to the particular IoT device family; and initiating, via the at least one computing device, changing a firmware image of the particular IoT device to the second version over the network based on the firmware change profile.

Clause 29. The method of clause 28 or any of the clauses contained herein, further comprising: interrogating, via the at least one computing device, the particular IoT device over the network according to an interrogation profile corresponding to the particular IoT device family to determine a current firmware version; in response to the current firmware version matching the second version, updating, via the at least one computing device, a corresponding for the particular IoT device in a data store.

Clause 30. The method of clause 28 or any of the clauses contained herein, wherein the request is received via at least one of: a web page or a scheduled process.

Clause 31. The method of clause 28 or any of the clauses contained herein, further comprising: determining, via the at least one computing device, an upgrade path for the particular IoT device based on the first version, the second version, and the firmware change profile; and initiating, via the at least one computing device, changing the firmware image of the particular IoT device to at least one intermediary version based on the upgrade path.

Clause 32. The method of clause 28 or any of the clauses contained herein, further comprising: performing, via the at least one computing device, an interrogation the particular IoT device over the network according to an interrogation profile; and determining, via the at least one computing device, that the first version of the firmware is currently installed based at least in part on features available on the particular IoT device.

Clause 33. The method of clause 28 or any of the clauses contained herein, wherein the firmware image is stored in a blockchain ledger store and the at least one computing device is further configured to verify a hash associated with the firmware image in the blockchain ledger store prior to initiating changing of the firmware image.

Clause 34. A non-transitory computer-readable medium embodying a program that, when executed by at least one computing device, causes the at least one computing device to at least: receive a request to change firmware of a particular IoT device of a plurality of IoT devices from a first version over a particular network, the first version being specified in a corresponding one of a plurality of firmware versions; identify a particular IoT device family for the particular IoT device; determine a firmware change profile corresponding to the particular IoT device family; and initiate changing a firmware image of the particular IoT device to a second version over the network based on the firmware change profile.

Clause 35. The non-transitory computer-readable medium of clause 34 or any of the clauses contained herein, wherein the at least one computing device is further configured to: apply a policy to the particular IoT device in response to the request to change firmware; and identify the second version for installation according to the policy.

Clause 36. The non-transitory computer-readable medium of clause 34 or any of the clauses contained herein, wherein the at least one computing device is further configured to: subsequent to changing the firmware image, interrogate the particular IoT device over the network according to an interrogation profile corresponding to the particular IoT device family to determine a current firmware version; in response to the current firmware version matching the second version, update the a corresponding version for the particular IoT device in a data store.

Clause 37. The non-transitory computer-readable medium of clause 34 or any of the clauses contained herein, wherein the request is received via at least one of: a web page or a scheduled process.

Clause 38. The non-transitory computer-readable medium of clause 34 or any of the clauses contained herein, wherein the program further causes the at least one computing device to: determine an upgrade path for the particular IoT device based on the first version, the second version, and the firmware change profile; and prior to initiate changing of the firmware image the second version, initiate changing the firmware image of the particular IoT device to at least one intermediary version based on the upgrade path.

Clause 39. The non-transitory computer-readable medium of clause 34 or any of the clauses contained herein, wherein the firmware image is stored in a blockchain ledger store and the program further causes the at least one computing device to verify a hash associated with the firmware image in the blockchain ledger store prior to initiating changing of the firmware image.

Clause 40. The non-transitory computer-readable medium of clause 34 or any of the clauses contained herein, wherein the program further causes the at least one computing device to: perform an interrogation the particular IoT device over the network according to an interrogation profile; and determine that an expected version of firmware is not currently installed based at least in part on the interrogation.

Clause 41. A system comprising, a data store comprising data mapping a plurality of credentials to a plurality of internet of things (IoT) devices; and at least one computing device in communication with the data store, the at least one computing device being configured to at least: receive a request to change a security component of a particular credential of the plurality of credentials; identify a particular IoT device of the plurality of IoT devices corresponding to the particular credential according to the mapping in the data store; identify a particular IoT device family for the particular IoT device; determine a credential change profile corresponding to the particular IoT device family; and initiate changing of a credential for the particular IoT device over the network based on the credential change profile.

Clause 42. The system of clause 41 or any of the clauses contained herein, wherein the plurality of credentials in the data store excludes at least one security component necessary to authenticate with the plurality IoT devices.

Clause 43. The system of clause 41 or any of the clauses contained herein, wherein the credential change profile specifies at least one protocol supported by the particular IoT device family and initiating changing of the credential is performed via the at least one protocol.

Clause 44. The system of clause 41 or any of the clauses contained herein, wherein the request is received from a privileged access management (PAM) system and the at least one computing device is further configured to register the plurality of credentials with the PAM system.

Clause 45. The system of clause 41 or any of the clauses contained herein, further comprising a plugin configured to be installed on a PAM system, wherein the plugin is configured to send the request to change the security component to the at least one computing device when the PAM system initiates an update of the security component.

Clause 46. The system of clause 41 or any of the clauses contained herein, wherein the at least one computing device is further configured to: determine a plurality of sets of password limitations, where each set of password limitations corresponds to a respective one of the plurality of IoT devices; generate a plurality of password policies for the plurality of IoT devices; and set a respective password policy of the plurality of password policies for each of the plurality of credentials in a PAM system according to the mapping.

Clause 47. The system of clause 41 or any of the clauses contained herein, wherein the at least one computing device is further configured to: determine that the particular device is unavailable based at least in part on the changing of the credential failing; store the incomplete credential change in the data store; in response to determining the particular device is subsequently available, reinitiate changing of the credential for the particular IoT device over the network based on the credential change profile.

Clause 48. A method comprising, receiving, via at least one computing device, a request to change a security component of a particular credential of a plurality of credentials; identifying, via the at least one computing device, a particular IoT device of a plurality of internet of things (IoT) devices corresponding to the particular credential according to a mapping of the plurality of credentials to the plurality of IoT devices; identifying, via the at least one computing device, a particular IoT device family for the particular IoT device; determining, via the at least one computing device, a credential change profile corresponding to the particular IoT device family; and initiating, via the at least one computing device, changing of a credential for the particular IoT device over the network based on the credential change profile.

Clause 49. The method of clause 48 or any of the clauses contained herein, further comprising: prior to initiating changing of the credential: receiving, via the at least one computing device, a current security component for the particular credential from a PAM system; and performing, via the at least one computing device, an authentication with the particular IoT device using the current security component.

Clause 50. The method of clause 48 or any of the clauses contained herein, further comprising: receiving, via the at least one computing device, a current security component for the particular credential from a PAM system; and performing, via the at least one computing device, an authentication with the particular IoT device using the current security component; in response to the authentication failing, performing, via the at least one computing device, an authentication with the particular IoT device using a default credential for the particular IoT device family.

Clause 51. The method of clause 48 or any of the clauses contained herein, wherein the plurality of credentials excludes at least one security component necessary to authenticate with the plurality IoT devices.

Clause 52. The method of clause 51 or any of the clauses contained herein, wherein the at least one security component comprises a password.

Clause 53. The method of clause 48 or any of the clauses contained herein, wherein the credential change profile specifies at least one protocol supported by the particular IoT device family and initiating changing of the credential is performed via the at least one protocol.

Clause 54. The method of clause 48 or any of the clauses contained herein, further comprising registering, via the at least one computing device, with a PAM system for the plurality of credentials.

Clause 55. The method of clause 48 or any of the clauses contained herein, further comprising sending, via a plugin configured to be installed on a PAM system, the request to change the security component to the at least one computing device when the PAM system initiates an update of the security component.

Clause 56. The method of clause 48 or any of the clauses contained herein, further comprising: determining, via the at least one computing device, a plurality of sets of password limitations, where each set of password limitations corresponds to a respective one of the plurality of IoT devices; generating, via the at least one computing device, a plurality of password policies for the plurality of IoT devices; and setting, via the at least one computing device, a respective password policy of the plurality of password policies for each of the plurality of credentials in a PAM system according to the mapping.

Clause 57. A non-transitory computer-readable medium embodying a program that, when executed by at least one computing device, causes the at least one computing device to at least: receive a request to change a security component of a particular credential of a plurality of credentials; identify a particular IoT device of a plurality of internet of things (IoT) devices corresponding to the particular credential according to a mapping of the plurality of credentials to the plurality of IoT devices; identify a particular IoT device family for the particular IoT device; determine a credential change profile corresponding to the particular IoT device family; and initiate changing of a credential for the particular IoT device over the network based on the credential change profile.

Clause 58. The non-transitory computer-readable medium of clause 57 or any of the clauses contained herein, wherein the program further causes the at least one computing device to: prior to initiating changing of the credential: receive a current security component for the particular credential from a PAM system; and perform an authentication with the particular IoT device using the current security component.

Clause 59. The non-transitory computer-readable medium of clause 57 or any of the clauses contained herein, wherein the program further causes the at least one computing device to: receive a current security component for the particular credential from a PAM system; and perform an authentication with the particular IoT device using the current security component; in response to the authentication failing, perform an authentication with the particular IoT device using a default credential for the particular IoT device family.

Clause 60. The non-transitory computer-readable medium of clause 57 or any of the clauses contained herein, wherein the program further causes the at least one computing device to: determine that the particular device is unavailable based at least in part on the changing of the credential failing; store the incomplete credential change in the data store; in response to determining the particular device is subsequently available, reinitiate changing of the credential for the particular IoT device over the network based on the credential change profile.

Clause 61. A system comprising, a data store comprising data describing a plurality of internet of things (IoT) devices; and at least one computing device in communication with the data store, the at least one computing device being configured to at least: identify a plurality of IoT device families individually associated with a respective at least one of the plurality of IoT devices; interrogate each of the plurality of IoT devices over the network based on the plurality of IoT device families to determine a plurality of sets of IoT device configurations; analyze each set of IoT device configurations to identify at least one configuration setting of a particular IoT device to be changed; and modify the at least one configuration setting based on a particular IoT device family from the plurality of IoT device families that corresponds to the particular IoT device.

Clause 62. The system of clause 61 or any of the clauses contained herein, wherein the at least one configuration is modified based on a particular IoT device family by determining an update procedure for the particular IoT device family and performing the update procedure.

Clause 63. The system of clause 62 or any of the clauses contained herein, wherein the update procedure comprises modifying the setting via at least one of: a telnet connection, an HTTP connection, a proprietary socket connection, and an FTP connection.

Clause 64. The system of clause 61 or any of the clauses contained herein, wherein the at least one computing device is further configured to analyze a set of the IoT device configurations corresponding to a particular IoT device by applying a plurality of rules associated with a particular IoT device family of the particular IoT device.

Clause 65. The system of clause 61 or any of the clauses contained herein, wherein the at least one computing device is further configured to analyze each of the sets of the IoT device configurations to identify at least one security vulnerability, wherein modifying the at least one configuration setting comprises disabling a feature associated with the at least one security vulnerability.

Clause 66. The system of clause 61 or any of the clauses contained herein, wherein the at least one computing device is further configured to: receive a system-wide configuration update to a particular setting; determine a corresponding setting for a particular IoT device family of the plurality of IoT device families; and modify the corresponding setting for each of the plurality of IoT devices that belong to the particular IoT device family.

Clause 67. The system of clause 66 or any of the clauses contained herein, wherein the at least one computing device is further configured to: determine a corresponding second setting for a second particular IoT device family of the plurality of IoT device families; and modify the corresponding second setting for each of the plurality of IoT devices that belong to the particular second IoT device family.

Clause 68. A method comprising, identifying, via at least one computing device, a plurality of internet of things (IoT) device families individually associated with a respective at least one of a plurality of IoT devices; interrogating, via the at least one computing device, each of the plurality of IoT devices over the network based on the plurality of IoT device families to determine a plurality of sets of IoT device configurations; analyzing, via the at least one computing device, each set of IoT device configurations to identify at least one configuration setting of a particular IoT device to be changed; and modify the at least one configuration setting based on a particular IoT device family from the plurality of IoT device families that corresponds to the particular IoT device.

Clause 69. The method of clause 68 or any of the clauses contained herein, wherein the at least one configuration is modified based on a particular IoT device family by determining an update procedure for the particular IoT device family and performing the update procedure.

Clause 70. The method of clause 69 or any of the clauses contained herein, wherein the update procedure comprises modifying the setting via at least one of: a telnet connection, an HTTP connection, a proprietary socket connection, and an FTP connection.

Clause 71. The method of clause 68 or any of the clauses contained herein, further comprising analyzing, via the at least one computing device, a set of the IoT device configurations corresponding to a particular IoT device by applying a plurality of rules associated with a particular IoT device family of the particular IoT device.

Clause 72. The method of clause 68 or any of the clauses contained herein, further comprising analyzing, via the at least one computing device, each of the sets of the IoT device configurations to identify at least one security vulnerability, wherein modifying the at least one configuration setting comprises disabling a feature associated with the at least one security vulnerability.

Clause 73. The method of clause 68 or any of the clauses contained herein, further comprising: receiving, via the at least one computing device, a system-wide configuration update to a particular setting; determining, via the at least one computing device, a corresponding setting for a particular IoT device family of the plurality of IoT device families; and modifying, via the at least one computing device, the corresponding setting for each of the plurality of IoT devices that belong to the particular IoT device family.

Clause 74. The method of clause 73 or any of the clauses contained herein, further comprising: determining, via the at least one computing device, a corresponding second setting for a second particular IoT device family of the plurality of IoT device families; and modifying, via the at least one computing device, the corresponding second setting for each of the plurality of IoT devices that belong to the particular second IoT device family.

Clause 75. A non-transitory computer-readable medium embodying a program that, when executed by at least one computing device, causes the at least one computing device to at least: identify a plurality of internet of things (IoT) device families individually associated with a respective at least one of a plurality of IoT devices; interrogate each of the plurality of IoT devices over the network based on the plurality of IoT device families to determine a plurality of sets of IoT device configurations; analyze each set of IoT device configurations to identify at least one configuration setting of a particular IoT device to be changed; and modify the at least one configuration setting based on a particular IoT device family from the plurality of IoT device families that corresponds to the particular IoT device.

Clause 76. The non-transitory computer-readable medium of clause 75 or any of the clauses contained herein, wherein the at least one configuration is modified based on a particular IoT device family by determining an update procedure for the particular IoT device family and performing the update procedure.

Clause 77. The non-transitory computer-readable medium of clause 75 or any of the clauses contained herein, wherein the program further causes the at least one computing device to analyze a set of the IoT device configurations corresponding to a particular IoT device by applying a plurality of rules associated with a particular IoT device family of the particular IoT device.

Clause 78. The non-transitory computer-readable medium of clause 75 or any of the clauses contained herein, wherein the program further causes the at least one computing device to analyze each of the sets of the IoT device configurations to identify at least one security vulnerability, wherein modifying the at least one configuration setting comprises disabling a feature associated with the at least one security vulnerability.

Clause 79. The non-transitory computer-readable medium of clause 75 or any of the clauses contained herein, wherein the program further causes the at least one computing device to: receive a system-wide configuration update to a particular setting; determine a corresponding setting for a particular IoT device family of the plurality of IoT device families; and modify the corresponding setting for each of the plurality of IoT devices that belong to the particular IoT device family.

Clause 80. The non-transitory computer-readable medium of clause 79 or any of the clauses contained herein, wherein program further causes the at least one computing device to: determine a corresponding second setting for a second particular IoT device family of the plurality of IoT device families; and modify the corresponding second setting for each of the plurality of IoT devices that belong to the particular second IoT device family.

What is claimed is:

1. A system comprising,
   a data store comprising a data mapping of a plurality of credentials to a plurality of internet of thing (IoT) devices; and
   at least one computing device in communication with the data store, the at least one computing device being configured to at least:
      receive a request to change a security component of a particular credential of the plurality of credentials;
      identify a particular IoT device of the plurality of IoT devices corresponding to the particular credential according to the data mapping in the data store;
      identify a particular IoT device family for the particular IoT device;
      determine a credential change profile corresponding to the particular IoT device family;
      receive a current security component for the particular credential from a privileged access management (PAM) system;
      perform an authentication with the particular IoT device using the current security component;
      in response to the authentication failing, perform an authentication with the particular IoT device using a default credential for the particular IoT device family; and
      initiate changing of a credential for the particular IoT device over a network based on the credential change profile.

2. The system of claim 1, wherein the plurality of credentials in the data store excludes at least one security component necessary to authenticate with the plurality IoT devices.

3. The system of claim 1, wherein the credential change profile specifies at least one protocol supported by the particular IoT device family, and wherein initiating changing of the credential is performed via the at least one protocol.

4. The system of claim 1, wherein the request is received from the PAM system, and wherein the at least one computing device is further configured to register the plurality of credentials with the PAM system.

5. The system of claim 1, further comprising a plugin configured to be installed on the PAM system, wherein the plugin is configured to send the request to change the security component to the at least one computing device when the PAM system initiates an update of the security component.

6. The system of claim 1, wherein the at least one computing device is further configured to:
   determine a plurality of sets of password limitations, where each set of password limitations corresponds to a respective one of the plurality of IoT devices;
   generate a plurality of password policies for the plurality of IoT devices; and
   set a respective password policy of the plurality of password policies for each of the plurality of credentials in the PAM system according to the data mapping.

7. The system of claim 1, wherein the at least one computing device is further configured to:
   determine that the particular IoT device is unavailable based at least in part on the changing of the credential failing;
   store an incomplete credential change in the data store; and
   in response to determining the particular IoT device is subsequently available, reinitiate changing of the credential for the particular IoT device over the network based on the credential change profile.

8. The system of claim 1, wherein the at least one computing device is further configured to determine an availability of the particular device prior to initiating the changing of the credential for the particular IoT device.

9. The system of claim 1, wherein the program further causes the at least one computing device to determine the credential change profile by identifying a sequence of operations to perform to change the credential of the particular IoT device.

10. The system of claim 2, wherein the at least one security component comprises a password.

11. A method comprising,
receiving, via at least one computing device, a request to change a security component of a particular credential of a plurality of credentials;
identifying, via the at least one computing device, a particular IoT device of a plurality of internet of things (IoT) devices corresponding to the particular credential according to a mapping of the plurality of credentials to the plurality of IoT devices;
identifying, via the at least one computing device, a particular IoT device family for the particular IoT device;
determining, via the at least one computing device, a credential change profile corresponding to the particular IoT device family;
receiving, via the at least one computing device, a current security component for the particular credential from a PAM system;
performing, via the at least one computing device, an authentication with the particular IoT device using the current security component;
in response to the authentication failing, performing, via the at least one computing device, an authentication with the particular IoT device using a default credential for the particular IoT device family; and
initiating, via the at least one computing device, changing of a credential for the particular IoT device over a network based on the credential change profile.

12. The method of claim 11, wherein the current security component is received prior to initiating changing of the credential.

13. The method of claim 11, wherein the plurality of credentials excludes at least one security component necessary to authenticate with the plurality IoT devices.

14. The method of claim 13, wherein the at least one security component comprises a password.

15. The method of claim 11, wherein the credential change profile specifies at least one protocol supported by the particular IoT device family, and wherein initiating changing of the credential is performed via the at least one protocol.

16. The method of claim 11, further comprising registering, via the at least one computing device, with the PAM system for the plurality of credentials.

17. The method of claim 11, further comprising sending, via a plugin configured to be installed on the PAM system, the request to change the security component to the at least one computing device when the PAM system initiates an update of the security component.

18. The method of claim 11, further comprising:
determining, via the at least one computing device, a plurality of sets of password limitations, where each set of password limitations corresponds to a respective one of the plurality of IoT devices;
generating, via the at least one computing device, a plurality of password policies for the plurality of IoT devices; and
setting, via the at least one computing device, a respective password policy of the plurality of password policies for each of the plurality of credentials in the PAM system according to the mapping.

19. The method of claim 11, wherein the program further causes the at least one computing device to determine the credential change profile by identifying a sequence of operations to perform to change the credential of the particular IoT device.

20. The method of claim 11, further comprising:
determining that the particular IoT device is unavailable based at least in part on the changing of the credential failing;
storing the incomplete credential change in a data store; and
in response to determining the particular IoT device is subsequently available, reinitiating changing of the credential for the particular IoT device over the network based on the credential change profile.

21. A non-transitory computer-readable medium embodying a program that, when executed by at least one computing device, causes the at least one computing device to at least:
receive a request to change a security component of a particular credential of a plurality of credentials;
identify a particular IoT device of a plurality of internet of things (IoT) devices corresponding to the particular credential according to a mapping of the plurality of credentials to the plurality of IoT devices;
identify a particular IoT device family for the particular IoT device;
determine a credential change profile corresponding to the particular IoT device family;
receive a current security component for the particular credential from a PAM system;
perform an authentication with the particular IoT device using the current security component;
in response to the authentication failing, perform an authentication with the particular IoT device using a default credential for the particular IoT device family; and
initiate changing of a credential for the particular IoT device over a network based on the credential change profile.

22. The non-transitory computer-readable medium of claim 21, wherein the current security component is received prior to initiating changing of the credential.

23. The non-transitory computer-readable medium of claim 21, wherein the program further causes the at least one computing device to:
determine that the particular IoT device is unavailable based at least in part on the changing of the credential failing;
store the incomplete credential change in a data store; and
in response to determining the particular IoT device is subsequently available, reinitiate changing of the credential for the particular IoT device over the network based on the credential change profile.

24. The non-transitory computer-readable medium of claim 21, wherein the program further causes the at least one computing device to determine the credential change profile by identifying a sequence of operations to perform to change the credential of the particular IoT device.

25. The non-transitory computer-readable medium of claim 21, wherein the plurality of credentials excludes at least one security component necessary to authenticate with the plurality IoT devices.

26. The non-transitory computer-readable medium of claim 25, wherein the at least one security component comprises a password.

27. The non-transitory computer-readable medium of claim 21, wherein the credential change profile specifies at least one protocol supported by the particular IoT device family, and wherein initiating changing of the credential is performed via the at least one protocol.

28. The non-transitory computer-readable medium of claim 21, wherein the program further causes the at least one computing device to register, via the at least one computing device, with the PAM system for the plurality of credentials.

29. The non-transitory computer-readable medium of claim 21, wherein the program further causes the at least one computing device to send, via a plugin configured to be installed on the PAM system, the request to change the security component to the at least one computing device when the PAM system initiates an update of the security component.

30. The non-transitory computer-readable medium of claim 21, wherein the program further causes the at least one computing device to:
   determine, via the at least one computing device, a plurality of sets of password limitations, where each set of password limitations corresponds to a respective one of the plurality of IoT devices;
   generate, via the at least one computing device, a plurality of password policies for the plurality of IoT devices; and
   set, via the at least one computing device, a respective password policy of the plurality of password policies for each of the plurality of credentials in the PAM system according to the mapping.

* * * * *